US010162408B2

(12) United States Patent
Saito et al.

(10) Patent No.: US 10,162,408 B2
(45) Date of Patent: Dec. 25, 2018

(54) HEAD MOUNTED DISPLAY, DETECTION DEVICE, CONTROL METHOD FOR HEAD MOUNTED DISPLAY, AND COMPUTER PROGRAM

(71) Applicant: SEIKO EPSON CORPORATION, Tokyo (JP)

(72) Inventors: Hitoshi Saito, Azumino (JP); Masahide Takano, Matusmoto (JP); Hiroyuki Baba, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/631,654

(22) Filed: Jun. 23, 2017

(65) Prior Publication Data

US 2017/0285734 A1    Oct. 5, 2017

Related U.S. Application Data

(63) Continuation of application No. 14/718,732, filed on May 21, 2015, now Pat. No. 9,720,230.

(30) Foreign Application Priority Data

Jun. 6, 2014 (JP) .................................. 2014-117563
Jan. 21, 2015 (JP) .................................. 2015-009373

(51) Int. Cl.
*G06T 15/00* (2011.01)
*G06F 3/01* (2006.01)
(Continued)

(52) U.S. Cl.
CPC .......... *G06F 3/011* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 6,514,081 B1 * 2/2003 Mengoli ............ A63B 24/0003
434/252
7,457,439 B1    11/2008 Madsen et al.
(Continued)

FOREIGN PATENT DOCUMENTS

JP    H06130889 A    5/1994
JP    2001-236505 A   8/2001
(Continued)

*Primary Examiner* — Anh-Tuan V Nguyen
(74) *Attorney, Agent, or Firm* — Oliff PLC

(57) ABSTRACT

A head mounted display for supporting improvement in an act of moving a body is provided. The head mounted display includes image display unit that transmits external scenery therethrough and forms an image, a body motion detection unit that detects motions of a body of a user and at least a part of a tool bundled with the body, a model moving image acquisition unit that accesses a model moving image storage unit which stores, as a model moving image, a moving image showing a motion of the body, used as a reference of the act and stores the model moving image for each type of act, and acquires one or a plurality of model moving images corresponding to a detection result from the body motion detection unit, and a display control unit that causes the image display unit to form the acquired model moving image.

24 Claims, 15 Drawing Sheets

(51) Int. Cl.
  *G02B 27/01* (2006.01)
  *H04N 5/225* (2006.01)
  *G02B 27/00* (2006.01)
  *G06T 1/00* (2006.01)
  *H04N 13/117* (2018.01)
  *H04N 13/344* (2018.01)
  *H04N 5/232* (2006.01)
  *G06F 3/03* (2006.01)
  *G06T 13/40* (2011.01)
  *G06T 19/00* (2011.01)
  *G09B 5/02* (2006.01)
  *G09B 19/00* (2006.01)
  *H04N 13/239* (2018.01)
  *H04N 5/262* (2006.01)

(52) U.S. Cl.
  CPC ............ *G06F 3/012* (2013.01); *G06F 3/0304* (2013.01); *G06T 1/0007* (2013.01); *G06T 13/40* (2013.01); *G06T 19/006* (2013.01); *G09B 5/02* (2013.01); *G09B 19/0038* (2013.01); *H04N 5/2253* (2013.01); *H04N 5/23229* (2013.01); *H04N 5/23293* (2013.01); *H04N 13/117* (2018.05); *H04N 13/239* (2018.05); *H04N 13/344* (2018.05); *G02B 2027/014* (2013.01); *G02B 2027/0138* (2013.01); *G02B 2027/0178* (2013.01); *G02B 2027/0187* (2013.01); *G06F 3/015* (2013.01); *H04N 5/2621* (2013.01)

(56) References Cited

U.S. PATENT DOCUMENTS

| | | | |
|---|---|---|---|
| 9,350,951 B1 * | 5/2016 | Rowe | H04N 5/2621 |
| 2003/0191779 A1 | 10/2003 | Sagawa et al. | |
| 2005/0001842 A1 | 1/2005 | Park et al. | |
| 2005/0116172 A1 * | 6/2005 | Trinkaus | A61N 5/1031 250/363.02 |
| 2005/0156817 A1 * | 7/2005 | Iba | G02B 27/0093 345/8 |
| 2005/0223799 A1 * | 10/2005 | Murphy | A61B 5/1124 73/510 |
| 2007/0270214 A1 * | 11/2007 | Bentley | A61B 5/1122 463/30 |
| 2008/0278487 A1 * | 11/2008 | Gobert | G06K 9/00228 345/420 |
| 2009/0324014 A1 | 12/2009 | Kato et al. | |
| 2010/0173276 A1 * | 7/2010 | Vasin | A63B 24/0006 434/307 R |
| 2011/0098109 A1 * | 4/2011 | Leake | A63F 13/428 463/30 |
| 2012/0021833 A1 * | 1/2012 | Boch | G06F 3/011 463/36 |
| 2012/0122574 A1 | 5/2012 | Fitzpatrick et al. | |
| 2012/0188158 A1 * | 7/2012 | Tan | A61B 5/0488 345/156 |
| 2012/0190505 A1 * | 7/2012 | Shavit | A63B 71/0622 482/8 |
| 2012/0262484 A1 | 10/2012 | Gotffeld et al. | |
| 2013/0063432 A1 | 3/2013 | Kaps et al. | |
| 2013/0095924 A1 | 4/2013 | Geisner et al. | |
| 2013/0120445 A1 | 5/2013 | Shimomura et al. | |
| 2013/0171601 A1 * | 7/2013 | Yuasa | A61B 5/1114 434/258 |
| 2013/0225305 A1 * | 8/2013 | Yang | A63F 13/00 473/152 |
| 2013/0300650 A1 | 11/2013 | Liu | |
| 2014/0087871 A1 | 3/2014 | Kruglick | |
| 2014/0267662 A1 | 9/2014 | Lampo | |
| 2014/0347390 A1 * | 11/2014 | Poulos | G06T 19/006 345/633 |
| 2015/0035861 A1 * | 2/2015 | Salter | G02B 27/0179 345/633 |
| 2015/0091780 A1 | 4/2015 | Lyren | |
| 2015/0133820 A1 * | 5/2015 | Zohar | A61B 5/1118 600/595 |
| 2015/0355462 A1 | 12/2015 | Saito et al. | |
| 2016/0049089 A1 * | 2/2016 | Witt | G09B 19/0038 434/258 |
| 2017/0285734 A1 | 10/2017 | Saito et al. | |

FOREIGN PATENT DOCUMENTS

| | | |
|---|---|---|
| JP | 2003295754 A | 10/2003 |
| JP | 2006230630 A | 9/2006 |
| JP | 2009021914 A | 1/2009 |
| JP | 2010240185 A | 10/2010 |
| JP | 2013-034492 A | 2/2013 |
| JP | 2015-229052 A | 12/2015 |

\* cited by examiner

| TYPE | TEACHER MOVING IMAGE DATA | | | | | HEAD POSITION / FOCUSED PART DATA | | | | |
|---|---|---|---|---|---|---|---|---|---|---|
| SNOWPLOUGH TURN | 👤 | 👤 | ··· | 👤 | 👤 | | | ··· | | | ~R1
| STEM TURN | 👤 | 👤 | ··· | 👤 | 👤 | | | ··· | | | ~R2
| PARALLEL TURN | 👤 | 👤 | ··· | 👤 | 👤 | | | ··· | | | ~R3

| TYPE | TEACHER MOVING IMAGE DATA | | | | SWING DATA | | | | | |
|---|---|---|---|---|---|---|---|---|---|---|
| APPROACH SHOT | | ... | | | | | ... | | | ~R11 |
| IRON SHOT | | ... | | | | | ... | | | ~R12 |
| DRIVER SHOT | | ... | | | | | ... | | | ~R13 |

FIG.14

| TYPE | TEACHER MOVING IMAGE DATA | | | | HEAD POSITION / FOCUSED PART DATA | | | | |
|---|---|---|---|---|---|---|---|---|---|
| APPROACH SHOT | | ... | | | | | ... | | |
| IRON SHOT | | ... | | | | | ... | | |
| DRIVER SHOT | | ... | | | | | ... | | |

FIG.15

| TYPE | TEACHER MOVING IMAGE DATA | | | | BALL / HEAD RELATIVE POSITION DATA | | | | |
|---|---|---|---|---|---|---|---|---|---|
| APPROACH SHOT | | ... | | | | ... | | | ~R21 |
| IRON SHOT | | ... | | | | ... | | | ~R22 |
| DRIVER SHOT | | ... | | | | ... | | | ~R23 |

HEAD MOUNTED DISPLAY, DETECTION DEVICE, CONTROL METHOD FOR HEAD MOUNTED DISPLAY, AND COMPUTER PROGRAM

This application is a continuation application of U.S. patent application Ser. No. 14/718,732, filed on May 21, 2015, which claims priority to both of JP 2014-117563 filed on Jun. 6, 2014 and JP 2015-009373 filed on Jan. 21, 2015. The disclosures of all of the above applications are hereby incorporated by reference in their entireties.

BACKGROUND

1. Technical Field

The present invention relates to a head mounted display.

2. Related Art

In the related art, there is a head mounted display (HMD) which is mounted on the head. The head mounted display generates image light showing an image by using, for example, a liquid crystal display and a light source, and guides the generated image light to the eyes of a user by using a projection optical system or a light guide plate so that the user visually recognizes a virtual image.

JP-A-2009-21914 and JP-A-2010-240185 disclose a technique of using a head mounted display in order to support improvement in an act of moving a body in sports, dancing, or the like. According to JP-A-2009-21914, a shape of a participant who is a user can be imaged by using an imaging device which is provided in a head mounted display worn by an instructor. According to JP-A-2010-240185, an operation of a participant who is a user can be captured by using motion sensors mounted on the limbs. For this reason, according to the head mounted displays disclosed in JP-A-2009-21914 and JP-A-2010-240185, it is possible to simultaneously display a moving image of the instructor which is prepared in advance, and a moving image showing an operation of the participant. JP-A-2006-230630, JP-A-6-130889, and JP-A-2003-295754 are other examples of the related art.

Generally, not one act to be improved but a plurality of acts are made for each procedure or scene for improvement. For example, in golf, there are a drive part, an approach part, and a shot part. For this reason, in a case where a user intends to practice a drive, the user is required to pick out and reproduce an instructor moving image of the drive part among a plurality of instructor moving images. In a case where the user intends to practice an approach, the user is required to pick out and reproduce an instructor moving image of the approach part. An advantage of using the head mounted display is that an operator can view an instructor moving image in the middle of practicing a sport or dancing, and thus complex operations while practicing are not preferable. Therefore, in the related art, there is a need to reproduce an instructor moving image suitable for an act which is desired to be practiced, without performing complex operations. In addition, in the head mounted displays of the related art, achievement of a compact device configuration, a low cost, resource saving, and facilitation of manufacturing, improvement in a user's convenience, improvement in a learning effect, and the like are desirable.

SUMMARY

An advantage of some aspects of the invention is to solve at least a part of the problems described above, and the invention can be implemented as the following forms.

(1) An aspect of the invention is directed to a head mounted display for supporting improvement in an act of moving a body. The head mounted display includes image display unit that transmits external scenery therethrough and forms an image; a body motion detection unit that detects motions of a body of a user and at least a part of a tool bundled with the body; a reference image acquisition unit that accesses a reference image storage unit which stores a reference image used as a reference of the act for each type of act, and acquires one or a plurality of reference images corresponding to a detection result from the body motion detection unit; and a display control unit that causes the image display unit to form the acquired reference image. According to the head mounted display of the aspect, one or a plurality of reference images corresponding to motions of the body or the like of the user and at least a part of a tool bundled with the body, detected by the body motion detection unit, are acquired from the reference image storage unit by the reference image acquisition unit, and are displayed on the image display unit. For this reason, it is possible to display a reference image (corresponding to an "instructor moving image" of the related art) suitable for an act to be practiced without performing complex operations.

(2) In the head mounted display according to the aspect described above, the reference image may be an image showing a motion of the body. According to the head mounted display of the aspect, the improvement in an act can be supported by the reference image showing a motion of the body.

(3) In the head mounted display according to the aspect described above, the body motion detection unit may include a body imaging camera that is installed at a spectacle portion supporting the image display unit. According to the head mounted display of the aspect, the number of devices constituting the head mounted display does not increase even if the body motion detection unit is provided. Therefore, it is possible to achieve a compact device configuration.

(4) In the head mounted display according to the aspect described above, the body imaging camera may be installed so that an imaging direction is a downward direction. According to the head mounted display of the aspect, it is possible to detect a motion of at least the legs.

(5) In the head mounted display according to the aspect described above, the body motion detection unit may include a motion sensor that is mounted on a specific part of the body and detects a motion of the specific part. According to the head mounted display of the aspect, a motion of a specific part of the body is detected with high accuracy by the motion sensor.

(6) The head mounted display according to the aspect described above may further include a user moving image creation unit that creates an illustration moving image of the user on the basis of a detection result from the body motion detection unit; the reference image may be a moving image; and the display control unit may cause an illustration moving image of the user to be formed in addition to the reference image. According to the head mounted display of the aspect, the user can view both of the reference image (moving image) and the illustration moving image of the user on the image display unit. Consequently, the user can compare the illustration moving image of the user with the reference image, and thus it is possible to increase a learning effect.

(7) In the head mounted display according to the aspect described above, the body motion detection unit may include an external camera that is disposed at a position spaced apart from a spectacle portion supporting the image display unit and images the user. According to the head mounted display of the aspect, the user can be imaged by using the external camera.

(8) In the head mounted display according to the aspect described above, the display control unit may cause an image of the user captured by the external camera to be formed in addition to the reference image. According to the head mounted display of the aspect, the user can view the image of the user along with the reference image. Consequently, the user can recognize a motion of the user realistically, and thus a user's convenience is improved.

(9) In the head mounted display according to the aspect described above, the reference image may be an image showing a motion of a tool bundled with the body. According to the head mounted display of the aspect, the improvement in an act can be supported by the reference image showing a motion of the tool bundled with the body.

(10) In the head mounted display according to the aspect described above, the body motion detection unit may detect relative positions between the tool and a target object related to the tool. According to the head mounted display of the aspect, it is possible to estimate a motion of the tool bundled with the body of the user on the basis of relative positions between the tool and the target object.

(11) Another aspect according to the invention is directed to a head mounted display for supporting improvement in an act of moving a body. The head mounted display includes an image display unit that transmits external scenery therethrough and forms an image; a body imaging camera that is installed at a spectacle portion supporting the image display unit; a user moving image creation unit that creates an illustration moving image of a user on the basis of an image captured by the body imaging camera; a reference moving image acquisition unit that acquires a reference moving image from a reference moving image storage unit which stores a moving image showing a motion of the body, used as a reference of the act, as the reference moving image; and a display control unit that causes the image display unit to form the illustration moving image of the user and the reference moving image. According to the head mounted display of the aspect, the number of devices constituting the head mounted display does not increase even if the body imaging camera is provided. The user can compare the illustration moving image of the user with the reference image. Therefore, it is possible to achieve both a compact device configuration and an increase in a learning effect.

(12) Still another aspect according to the invention is directed to a detection device used together with a head mounted display for supporting improvement in an act of moving a body, the head mounted display including an image display unit that transmits external scenery therethrough and forms an image; a reference image acquisition unit that accesses a reference image storage unit which stores a reference image used as a reference of the act for each type of act, and acquires one or a plurality of reference images corresponding to predetermined information; and a display control unit that causes the image display unit to form the acquired reference image. The detection device detects motions of a body of a user and at least a part of a tool bundled with the body, and transmits a result of the detection to the head mounted display as the predetermined information. According to the detection device of the aspect, in the same manner as in the head mounted display of the aspect, it is possible to display a reference image suitable for an act to be practiced without performing complex operations.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result, may be treated as an independent aspect of the invention.

For example, one aspect of the invention may be implemented as a device which includes some or all of the four constituent elements including the image display unit, the body motion detection unit, the reference image acquisition unit, and the display control unit. In other words, this device may or may not include the image display unit. The device may or may not include the body motion detection unit. The device may or may not include the reference image acquisition unit. The device may or may not include the display control unit. For example, the image display unit may transmit external scenery and also form an image. For example, the body motion detection unit may detect motions of a user's body and at least a part of a tool bundled with the body. For example, the reference image acquisition unit may access a reference image storage unit which stores a reference image used as a reference of the act for each type of act, and may acquire one or a plurality of reference images corresponding to a detection result from the body motion detection unit. For example, the display control unit may cause the image display unit to form the acquired reference image. This device may be implemented as, for example, a head mounted display, but may be implemented as devices other than the head mounted display. According to such an aspect, it is possible to achieve at least one of achievement of a compact device configuration, a low cost, resource saving, and facilitation of manufacturing, improvement in a user's convenience, improvement in a learning effect, and the like. Some or all of the above-described technical features of each aspect of the head mounted display are applicable to the device.

For example, one aspect of the invention may be implemented as a device which includes some or all of the five constituent elements including the image display unit, the body imaging camera, the user moving image creation unit, the reference moving image acquisition unit, and the display control unit. In other words, this device may or may not include the image display unit. The device may or may not include the body imaging camera. The device may or may not include the user moving image creation unit. The device may or may not include the reference moving image acquisition unit. The device may or may not include the display control unit. For example, the image display unit may transmit external scenery and also form an image. For example, the body imaging camera may be installed at a spectacle portion supporting the image display unit. For example, the user moving image creation unit may create an illustration moving image of a user on the basis of an image captured by the body imaging camera. For example, the reference moving image acquisition unit may acquire a reference moving image from a reference moving image storage unit which stores a moving image showing a motion of the body, used as a reference of the act, as the reference moving image. For example, the display control unit may cause the image display unit to form the illustration moving image of the user and the reference moving image. This device may be implemented as, for example, a head mounted display, but may be implemented as devices other than the head mounted display. According to such an aspect, it is possible to achieve at least one of achievement of a compact device configuration, a low cost, resource saving, and facilitation of manufacturing, improvement in a user's convenience, improvement in a learning effect, and the like. Some or all of the above-described technical features of each aspect of the head mounted display are applicable to the device.

The invention may be implemented in various forms other than a head mounted display. For example, the invention may be implemented in aspects such as a display device and a control method for the head mounted display and a display device, a head mounted display system, a computer program for implementing functions of the display device and the head mounted display system, and a recording medium for recording the computer program thereon.

BRIEF DESCRIPTION OF THE DRAWINGS

The invention will be described with reference to the accompanying drawings, wherein like numbers reference like elements.

FIG. 14 is a diagram showing a data configuration of a model moving image storage database in the second embodiment.

FIG. 15 is a diagram showing a data configuration of a model moving image storage database in a third embodiment.

DESCRIPTION OF EXEMPLARY EMBODIMENTS

Next, embodiments of the invention will be described in the following order with reference to the drawings.
A. First Embodiment
A-1. Configuration of Head Mounted Display
A-2. Ski Lesson Process
A-3. Effects
A-4. Modification Examples
B. Second Embodiment
C. Third Embodiment
D. Fourth Embodiment
E. Fifth Embodiment
F. Modification Examples

A. FIRST EMBODIMENT

A-1. Configuration of Head Mounted Display

Figure 1:
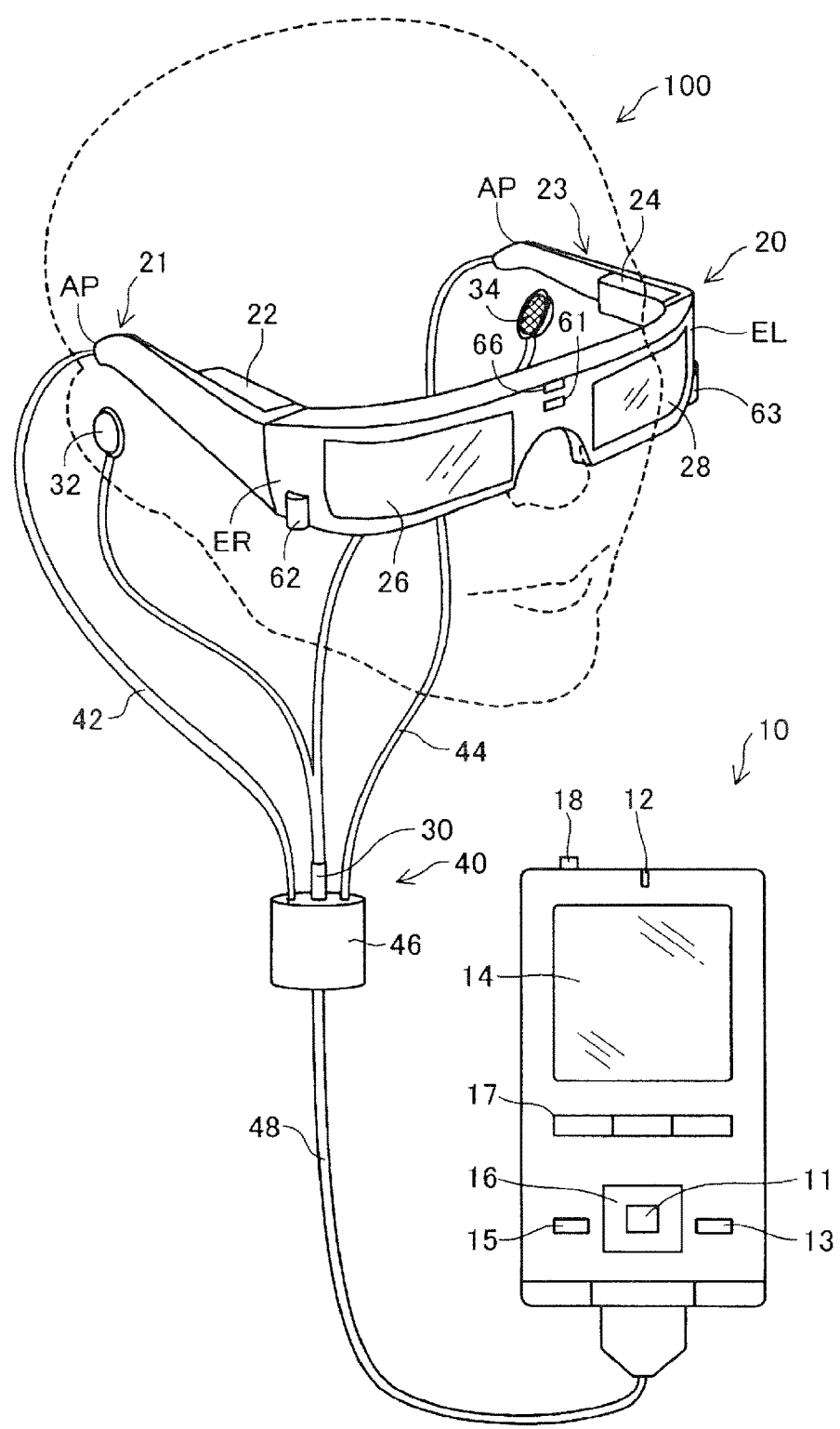
FIG. 1 is a diagram showing an exterior configuration of a head mounted display.

FIG. 1 is a diagram showing an exterior configuration of a head mounted display 100. The head mounted display 100 is a display mounted on the head, and is hereinafter also simply referred to as an HMD. The head mounted display 100 according to the present embodiment is an optical transmission type head mounted display which allows a user to visually recognize a virtual image and also to directly visually recognize external scenery. The head mounted display 100 of the present embodiment is a tool for receiving ski lesson at a ski resort. In the present specification, for convenience, a virtual image which is displayed by the head mounted display 100 and is visually recognized by the user is also referred to as a "displayed image". In addition, emitting image light generated on the basis of image data is also referred to as "displaying an image".

The head mounted display 100 includes an image display section 20 which allows the user to visually recognize a virtual image in a state of being mounted on the head of the user, and a control section 10 (a controller) which controls the image display section 20.

The image display section 20 is a mounting body which is mounted on the head of the user, and has a spectacle shape in the present embodiment. The image display section 20 includes a right holding unit 21, a right display driving unit 22, a left holding unit 23, a left display driving unit 24, a right optical image display unit 26, and a left optical image display unit 28. The right optical image display unit 26 and the left optical image display unit 28 are disposed so as to be respectively located in front of the right and left eyes of the user when the user wears the image display section 20. One end of the right optical image display unit 26 and one end of the left optical image display unit 28 are connected to each other at the position corresponding to the glabella of the user when the user wears the image display section 20.

The right holding unit 21 is a member which is provided so as to extend over a position corresponding to the temporal region of the user from an end part ER which is the other end of the right optical image display unit 26 when the user wears the image display section 20. Similarly, the left holding unit 23 is a member which is provided so as to extend over a position corresponding to the temporal region of the user from an end part EL which is the other end of the left optical image display unit 28 when the user wears the image display section 20. The right holding unit 21 and the left holding unit 23 hold the image display section 20 on the head in the same manner as temples of spectacles.

The right display driving unit 22 and the left display driving unit 24 are disposed on sides opposing the head of the user when the user wears the image display section 20. Hereinafter, the right holding unit 21 and the left holding unit 23 are collectively simply referred to as "holding units", the right display driving unit 22 and the left display driving unit 24 are collectively simply referred to as "display driving units", and the right optical image display unit 26 and the left optical image display unit 28 are collectively simply referred to as "optical image display units".

The display driving units 22 and 24 include liquid crystal displays (hereinafter, referred to as "LCDs") 241 and 242, projection optical systems 251 and 252, and the like (refer to FIG. 3). Details of configurations of the display driving units 22 and 24 will be described later. The optical image display units 26 and 28 as optical members include light guide plates 261 and 262 (refer to FIG. 3) and dimming plates. The light guide plates 261 and 262 are made of a light transmissive resin material or the like and, guide image light which is output from the display driving units 22 and 24 to the eyes of the user. The dimming plate is a thin plate-shaped optical element, and is disposed to cover a surface side (an opposite side to the user's eye side) of the image display section 20. The dimming plate protects the light guide plates 261 and 262 so as to prevent the light guide plates 261 and 262 from being damaged, polluted, or the like. In addition, light transmittance of the dimming plates is adjusted so as to adjust an amount of external light entering the eyes of the user, thereby controlling an extent of visually recognizing a virtual image. The dimming plate may be omitted.

Figure 2:
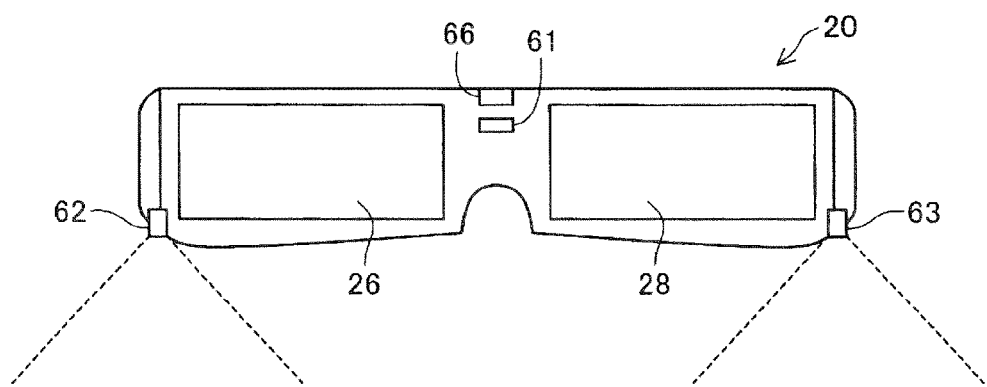
FIG. 2 is a front view of an image display section.

FIG. 2 is a front view of the image display section 20. As shown in FIGS. 1 and 2, the image display section 20 includes an external scenery imaging camera 61, a right body imaging camera 62, a left body imaging camera 63, and a nine-axis sensor 66 (also refer to the front view of FIG. 2). The right body imaging camera 62 and the left body imaging camera 63 are also collectively referred to as "body imaging cameras".

The external scenery imaging camera 61 is disposed at the position corresponding to the glabella of the user when the user wears the image display section 20. For this reason, the external scenery imaging camera 61 images external scenery located in a visual line direction of the user when the user mounts the image display section 20 on the head thereof. The external scenery imaging camera 61 is a monocular camera but may be a stereoscopic camera.

The right body imaging camera 62 is disposed downwardly (an imaging direction is a downward direction) at the end part ER which is the other end of the right optical image display unit 26. The left body imaging camera 63 is disposed downwardly (an imaging direction is a downward direction) at the end part EL which is the other end of the left optical image display unit 28. The right body imaging camera 62 and the left body imaging camera 63 image motions of the body of the user from the shoulders to the lower portions thereof in a state in which the user mounts the image display section 20 on the head thereof. The right body imaging camera 62 and the left body imaging camera 63 are monocular cameras but may be stereoscopic cameras.

The nine-axis sensor 66 is a motion sensor which detects acceleration (in three axes), angular velocity (in three axes), and geomagnetism (in three axes). The nine-axis sensor 66 is provided in the image display section 20, and thus detects a motion of the head of the user when the image display section 20 is mounted on the head of the user. A direction of the image display section 20 is specified on the basis of a detected motion of the head of the user.

As shown in FIG. 1, the image display section 20 includes a coupling unit 40 which couples the image display section 20 to the control section 10. The coupling unit 40 has a main body cord 48 connected to the control section 10, a right cord 42, a left cord 44, and a connection member 46. The right cord 42 and the left cord 44 are two cords into which the main body cord 48 branches. The right cord 42 is inserted into a casing of the right holding unit 21 from a tip end AP of the right holding unit 21 in the extending direction, and is coupled to the right display driving unit 22. Similarly, the left cord 44 is inserted into a casing of the left holding unit 23 from a tip end AP of the left holding unit 23 in the extending direction, and is coupled to the left display driving unit 24. The connection member 46 is provided at a branch point of the main body cord 48, the right cord 42, and the left cord 44, and is provided with a jag for coupling to an earphone plug 30. A right earphone 32 and a left earphone 34 extend from the earphone plug 30.

The image display section 20 and the control section 10 transmit various signals via the coupling unit 40. An end of the main body cord 48 on an opposite side to the connection member 46 and the control section 10 are respectively provided with connectors (not illustrated) fitted to each other. The control section 10 and the image display section 20 are coupled to or decoupled from each other through fitting or unfitting between the connector of the main body cord 48 and the connector of the control section 10. As the right cord 42, the left cord 44, and the main body cord 48, for example, a metal cable or an optical fiber may be used. The image display section 20 and the connection member 46, and the connection member 46 and the control section 10 are respectively connected to each other in a wired manner, but may be connected to each other in a wireless manner by using, for example, a wireless LAN or Bluetooth (registered trademark). The image display section 20 and the control section 10 may be directly connected to each other in a wireless manner.

The control section 10 is a device which controls the head mounted display 100. The control section 10 includes a determination key 11, a lighting unit 12, a display change key 13, a track pad 14, a luminance change key 15, a direction key 16, a menu key 17, and a power switch 18. The determination key 11 detects a pressing operation and outputs a signal for determining content which is operated in the control section 10. The lighting unit 12 performs a notification of an operation state of the head mounted display 100 by using its light emitting state. An operation state of the head mounted display 100 includes, for example, ON and OFF of a power supply. For example, a light emitting diode (LED) is used as the lighting unit 12. The display change key 13 detects a pressing operation and outputs a signal for changing a content moving image display mode between 3D and 2D. The track pad 14 detects an operation of the finger of the user on the operation surface of the track pad 14 and outputs a signal corresponding to detected content. As the track pad 14, various types such as an electrostatic type, a pressure detection type, and an optical type may be employed. The luminance change key 15 detects a pressing operation and outputs a signal for changing luminance of the image display section 20. The direction key 16 detects a pressing operation on a key corresponding to upper, lower, left, and right directions, and outputs a signal corresponding to detected content. The power switch 18 detects a sliding operation of the switch, and changes a power supply state of the head mounted display 100.

Figure 3:
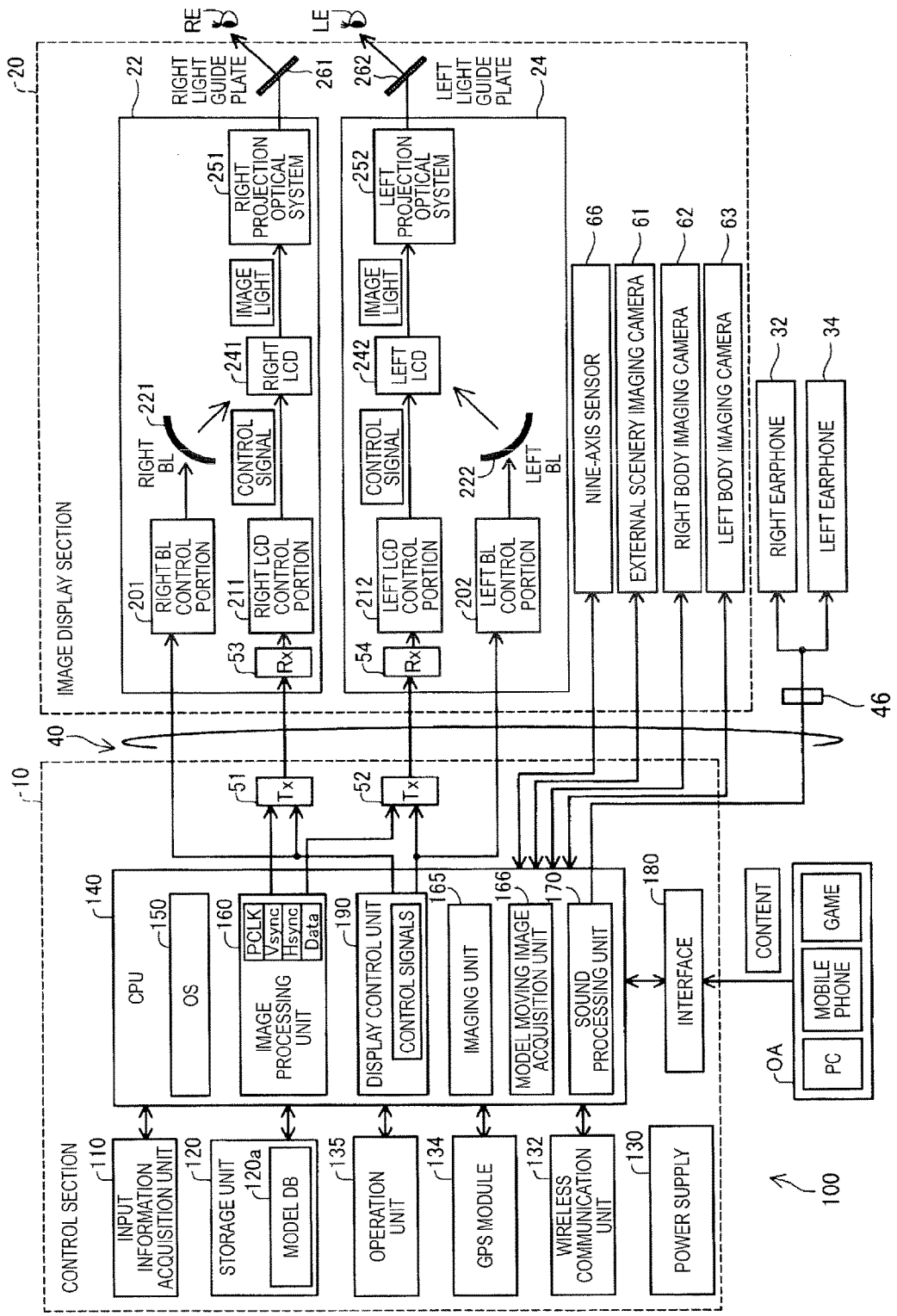
FIG. 3 is a functional block diagram showing a configuration of the head mounted display.

FIG. 3 is a functional block diagram showing a configuration of the head mounted display 100. The control section 10 includes an input information acquisition unit 110, a storage unit 120, a power supply 130, an operation unit 135, a CPU 140, an interface 180, a transmission unit 51 (Tx 51), a transmission unit 52 (Tx 52), a GPS module 134, and a wireless communication unit 132 as shown in FIG. 3.

The operation unit 135 receives an operation performed by the user, and includes, as shown in FIG. 1, the determination key 11, the display change key 13, the track pad 14, the luminance change key 15, the direction key 16, the menu key 17, and the power switch 18.

The input information acquisition unit 110 shown in FIG. 3 acquires a signal corresponding to an input operation performed by the user. As the signal corresponding to an input operation, there is a signal corresponding to an input operation on, for example, the track pad 14, the direction key 16, or the power switch 18, disposed in the operation unit 135. The power supply 130 supplies power to each unit of the head mounted display 100. For example, a secondary battery such as a lithium polymer battery or a lithium ion battery may be used as the power supply 130. A primary battery or a fuel cell may be used instead of a secondary battery. The head mounted display 100 may operate through the wireless supply of power. The head mounted display 100 may be supplied with power from a solar cell and a capacitor.

The storage unit 120 is constituted by a RAM, a ROM, a flash memory, or the like, and stores various computer programs or various data items. One of the various data items is a model moving image storage database (indicated by a model DB in FIG. 3) 120a. Details of the model moving image storage database 120a will be described later.

The GPS module 134 specifies the present position of the image display section 20 by receiving a signal from a GPS satellite, and generates information indicating the position. If the present position of the image display section 20 is specified, the present position of the user of the head mounted display 100 is specified. The wireless communication unit 132 performs wireless communication with other apparatuses in accordance with a predetermined wireless communication standard such as a wireless LAN or Bluetooth (registered trademark).

The CPU 140 reads and executes the computer programs stored in the storage unit 120 so as to function as an operation system 150 (an OS 150), a display control unit 190, a sound processing unit 170, an image processing unit 160, an imaging unit 165, and a model moving image acquisition unit 166.

The display control unit 190 generates control signals for control of the right display driving unit 22 and the left display driving unit 24. Specifically, the display control unit 190 individually controls a right LCD control portion 211 to turn on and off driving of a right LCD 241, a right backlight control portion 201 to turn on and off driving of a right backlight 221, a left LCD control portion 212 to turn on and off driving of a left LCD 242, and a left backlight control portion 202 to turn on and off driving of a left backlight 222, by using the control signals. Consequently, the display control unit 190 controls each of the right display driving unit 22 and the left display driving unit 24 to generate and emit image light. For example, the display control unit 190 causes both of the right display driving unit 22 and the left display driving unit 24 to generate image light, either of the units to generate image light, or neither of the units to generate image light.

The display control unit 190 transmits control signals for the right LCD control portion 211 and the left LCD control portion 212 thereto, respectively, via the transmission units 51 and 52. The display control unit 190 transmits control signals for the right backlight control portion 201 and the left backlight control portion 202 thereto, respectively.

The image processing unit 160 acquires an image signal included in content. The image processing unit 160 separates a synchronization signal such as a vertical synchronization signal VSync or a horizontal synchronization signal HSync from the acquired image signal. The image processing unit 160 generates a clock signal PCLK by using a phase locked loop (PLL) circuit (not illustrated) in accordance with a cycle of the separated vertical synchronization signal VSync or horizontal synchronization signal HSync. The image processing unit 160 converts the analog image signal from which the synchronization signal is separated, into a digital image signal by using an A/D conversion circuit (not illustrated) or the like. Then, the image processing unit 160 stores the converted digital image signal in the DRAM: of the storage unit 120 for each frame as image data (RGB data) of a target image. The image processing unit 160 may perform, on the image data, image processes such as a resolution conversion process, various color tone correction processes such as adjustment of luminance and color saturation, and a keystone correction process for the image data as necessary.

The image processing unit 160 transmits the generated clock signal PCLK, vertical synchronization signal VSync and horizontal synchronization signal HSync, and the image data stored in the DRAM of the storage unit 120 via the transmission units 51 and 52. The transmission units 51 and 52 function as a transceiver which performs serial transmission between the control section 10 and the image display section 20.

The sound processing unit 170 acquires an audio signal included in the content so as to amplify the acquired audio signal, and supplies the amplified audio signal to a speaker (not illustrated) of the right earphone 32 and a speaker (not illustrated) of the left earphone 34, coupled to the connection member 46. For example, in a case where a Dolby (registered trademark) system is employed, the audio signal is processed, and thus different sounds of which, for example, frequencies are changed are output from the right earphone 32 and the left earphone 34.

The imaging unit 165 drives the right body imaging camera 62 and the left body imaging camera 63 so as to image motions of the body of the user from both the shoulders to the lower portions (including the front side of the ski), and acquires captured moving images of the portions (hereinafter, referred to as "body moving images"). The model moving image acquisition unit 166 acquires a desired model moving image from the model moving image storage database 120a on the basis of the body moving image obtained by the imaging unit 165. Details of the imaging unit 165 and the model moving image acquisition unit 166 will be described later. The right body imaging camera 62, the left body imaging camera 63, the imaging unit 165, and the nine-axis sensor 66 constitute a "body motion detection unit" in an aspect of the invention.

The interface 180 couples the control section 10 to various external apparatuses OA which are supply sources of content. The external apparatuses OA may be, for example, a personal computer (PC), a portable telephone terminal, and a gaming terminal. For example, a USB interface, a micro-USB interface, or a memory card interface may be used as the interface 180.

The right display driving unit 22 includes a reception portion 53 (an Rx 53), the right backlight control portion 201 (the right BL control portion 201) and the right backlight 221 (the right BL 221) which function as a light source, the right LCD control portion 211 and the right LCD 241 which function as a display element, and a right projection optical system 251. The right backlight control portion 201 and the right backlight 221 function as a light source. The right LCD control portion 211 and the right LCD 241 function as a display element. The right backlight control portion 201, the right LCD control portion 211, the right backlight 221, and the right LCD 241 are also collectively referred to as a "right image light generation unit" or simply an "image light generation unit".

The reception portion 53 functions as a receiver which performs serial transmission between the control section 10 and the image display section 20. The right backlight control portion 201 drives the right backlight 221 on the basis of an input control signal. The right backlight 221 is a light emitting body such as an LED or an electroluminescence (EL) element. The right LCD control portion 211 drives the right LCD 241 on the basis of the clock signal PCLK, the vertical synchronization signal VSync, the horizontal synchronization signal HSync, and the right eye image data, which are input via the reception portion 53. The right LCD 241 is a transmissive liquid crystal panel in which a plurality of pixels are arranged in a matrix.

The right projection optical system 251 is constituted by a collimator lens which converts image light emitted from the right LCD 241 into parallel beams of light flux. The right light guide plate 261 as the right optical image display unit 26 guides image light output from the right projection optical system 251 to the right eye RE of the user while reflecting the light along a predetermined optical path. The right projection optical system 251 and the right light guide plate 261 are collectively referred to as a "right light guide unit" or simply a "light guide unit".

The left display driving unit 24 has the same configuration as that of the right display driving unit 22. In other words, the left display driving unit 24 includes a reception portion 54 (an Rx 54), the left backlight control portion 202 (the left BL control portion 202) and the left backlight 222 (the left BL 222) which function as a light source, the left LCD control portion 212 and the left LCD 242 which function as a display element, and a left projection optical system 252. The left backlight control portion 202 and the left backlight 222 function as a light source. The left LCD control portion 212 and the left LCD 242 function as a display element. The left backlight control portion 202, the left LCD control portion 212, the left backlight 222, and the left LCD 242 are also collectively as a "left image light generation unit" or simply an "image light generation unit". The left projection optical system 252 is constituted by a collimator lens which converts image light emitted from the left LCD 242 into parallel beams of light flux. The left light guide plate 262 as the left optical image display unit 28 guides image light output from the left projection optical system. 252 to the left eye LE of the user while reflecting the light along a predetermined optical path. The left projection optical system. 252 and the left light guide plate 262 are collectively referred to as a "left light guide unit" or simply a "light guide unit".

Figure 4:
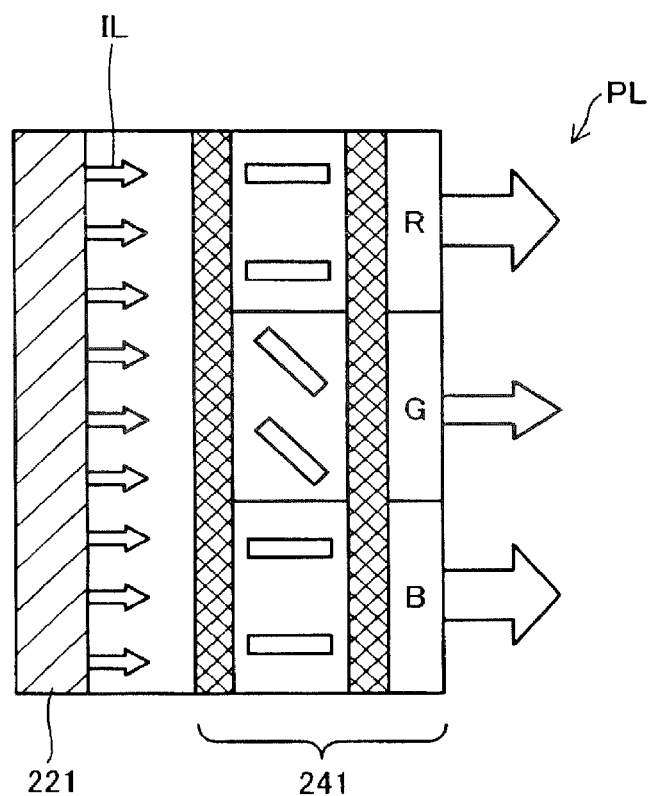
FIG. 4 is a diagram showing a state in which image light is emitted by an image light generation unit.

FIG. 4 is a diagram showing a state in which image light is emitted by the image light generation unit. The right LCD 241 drives liquid crystal at respective positions of the pixels arranged in a matrix so as to change transmittance of light which is transmitted through the right LCD 241, thereby modulating illumination light IL applied from the right backlight 221 into effective image light PL representing an image. This is also the same for the left LCD. In the present embodiment, a backlight type is employed, but image light may be emitted by using a front light type or a reflection type.

A-2. Ski Lesson Process

A ski lesson process in the present embodiment is aimed at learning to make turns when skiing. First, a participant who is a user of the head mounted display 100 records an image of the user while making turns, then reproduces and displays an illustration image created from the recorded image of the user and a model image, and compares the images with each other so as to learn a correct turning form.

Figure 5:
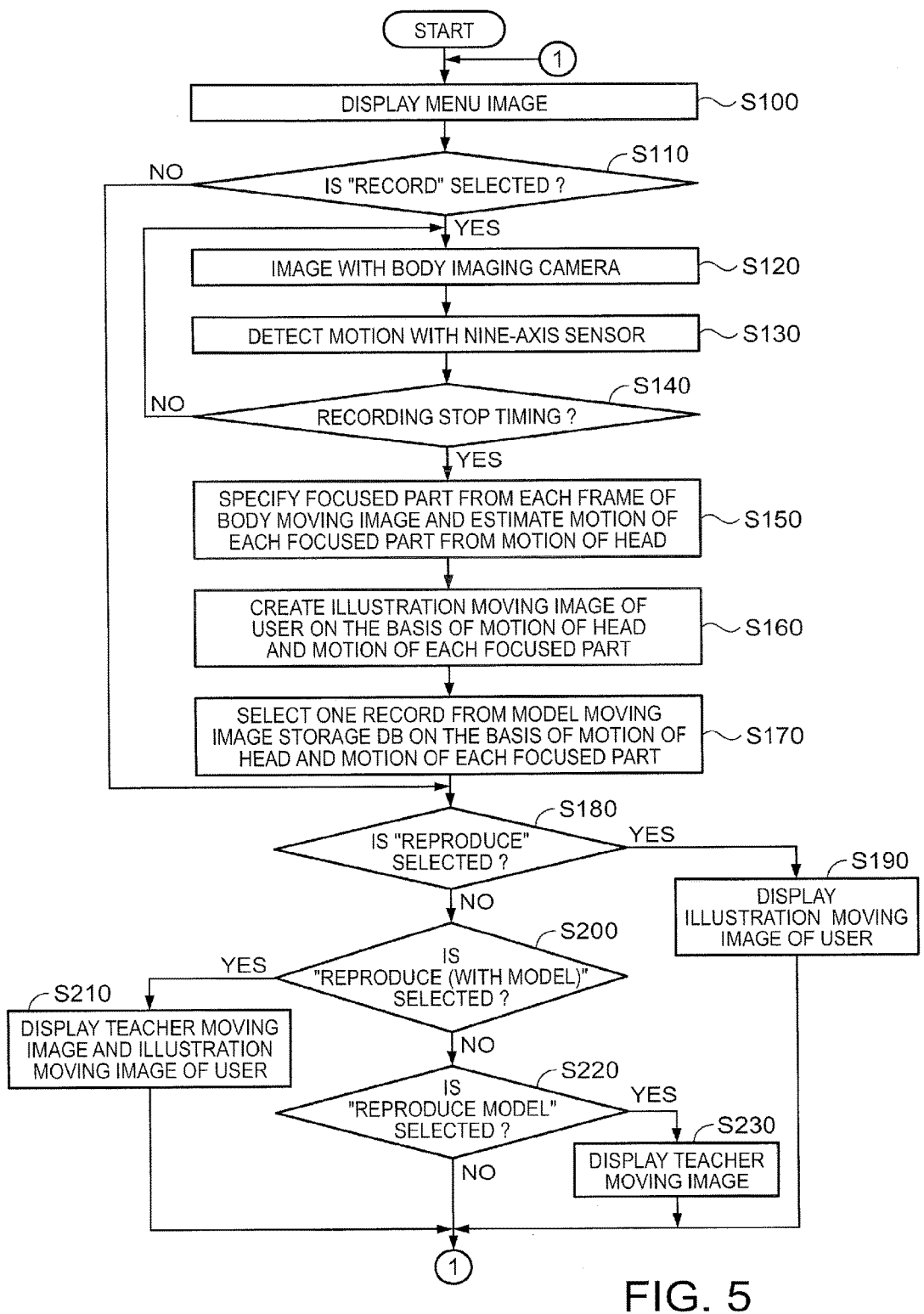
FIG. 5 is a flowchart showing a flow of a ski lesson process.

FIG. 5 is a flowchart showing a flow of a ski lesson process performed by the CPU 140. This ski lesson process is started when a predetermined operation is received in the control section 10. If the process is started, first, the CPU 140 displays a menu screen on the image display section 20 (step S100).

Figure 6:
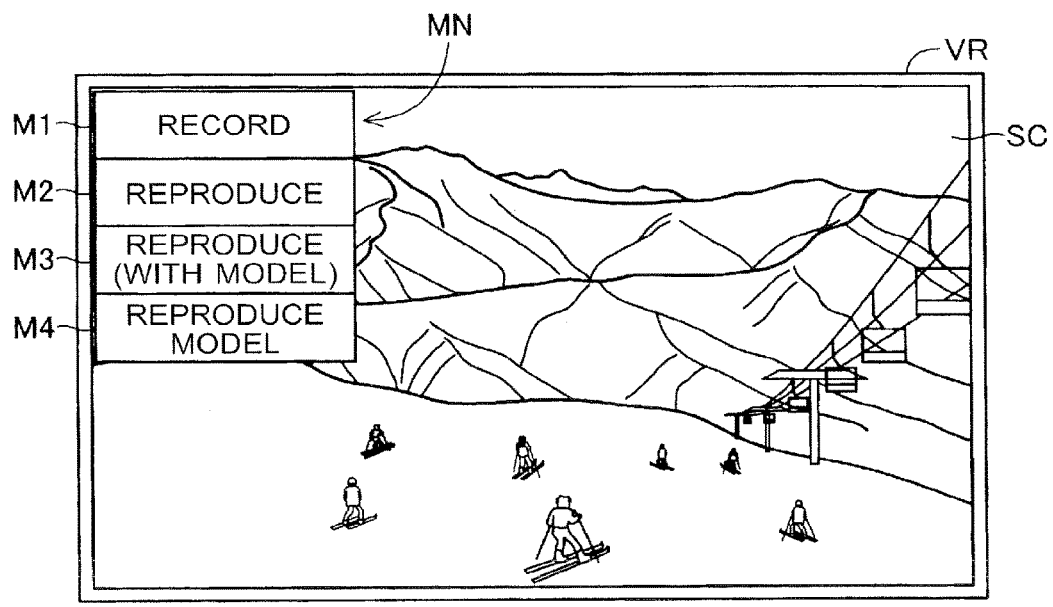
FIG. 6 is a diagram showing an example of a visual field which is visually recognized by a user.

FIG. 6 is a diagram showing an example of a visual field VR which is visually recognized by the user. As shown in FIG. 6, the user visually recognizes external scenery SC through the optical image display units 26 and 28 of the image display section 20. The external scenery SC includes, for example, a ski slope which the user will ski down. As a result of step S100, a menu screen MN is included in a part (for example, an upper left portion) of the visual field VR. In the present embodiment, the menu screen MN has four options M1 to M4 such as "record", "reproduce", "reproduce (with model)", and "reproduce model". The user first performs an operation of selecting the option M1 of "record" as a first stage of the ski lesson process, and then makes turns.

After step S100 of FIG. 5 is executed, the CPU determines whether or not the operation of selecting the option M1 of "record" has been received in the control section 10 which is operated by the user (step S110). Here, if it is determined that the operation of selecting the option M1 of "record" has been performed by the user and has been received, the CPU performs imaging by using the right and left body imaging cameras 62 and 63 (step S120). As a result of the imaging, body moving images obtained by imaging motions of the body of the user from the shoulders to the lower portions are stored in the DRAM of the storage unit 120 (refer to FIG. 3) for each frame. The process in step S120 corresponds to a process performed by the imaging unit 165 (refer to FIG. 3).

The CPU detects a motion of the head of the user by using the nine-axis sensor 66 (step S130). The motion of the head of the user mentioned here indicates a positional movement (a position, velocity, and acceleration) and a direction (shift angle) of the head. A motion of the head is changed in synchronization with timing of the change in the frames stored in step S120, and a detected motion of the head is stored in the DRAM of the storage unit 120 (refer to FIG. 3). The processes in steps S120 and S130 are illustrated to be sequentially executed, but are actually executed in parallel. In other words, the body imaging and the detection of a motion of the head are executed in parallel. Then, the CPU determines whether or not recording stop timing has come (step S140), and repeatedly performs the processes in steps S120 and S130 until the recording stop timing comes. The "recording stop timing" in the present embodiment is the time at which the present position of the user detected on the basis of the geomagnetism of the nine-axis sensor 66 is not changed, that is, the user stops making turns. Instead of the time at which the present position of the user is not changed, the recording stop timing may be the time at which a predetermined time has elapsed after the operation of selecting the option M1 of "record" is received. Alternatively, the recording stop timing may be other times such as the time at which the operation of selecting the option M1 of "record" is performed again.

On the other hand, if it is determined in step S140 that the recording stop timing has come, the CPU makes the process proceed to step S150. In step S150, the CPU performs a process of sequentially reading the body moving images stored in the storage unit 120 in step S120 for each frame, specifying a focused part from each frame, and estimating a motion of each focused part on the basis of the motion of the head detected in step S130.

Figure 7:
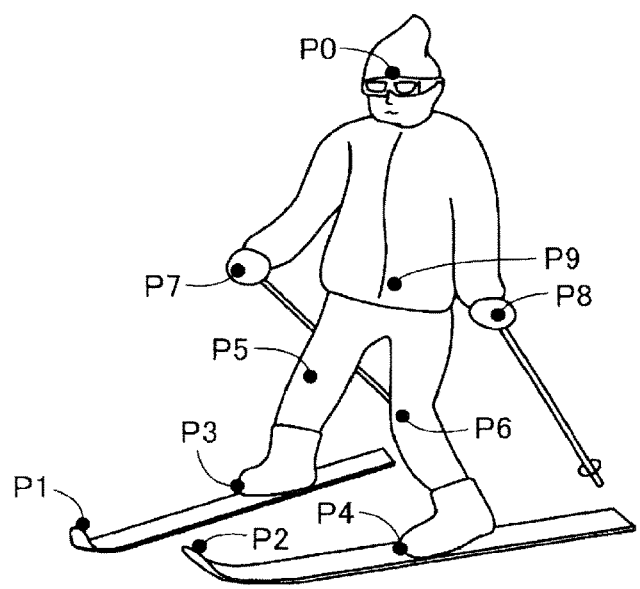
FIG. 7 is a diagram showing a focused part which is extracted.

FIG. 7 is a diagram showing focused parts extracted in step S150. In the present embodiment, the focused parts include a front end portion P1 of a right ski, a front end portion P2 of a left ski, a front end portion P3 of a right ski boot, a front end portion P4 of a left ski boot, a right knee portion P5, a left knee portion P6, a right wrist portion P7, a left wrist portion P8, and a navel portion P9. In addition, a position of P0 is a position of the nine-axis sensor 66, that is, a position of the head, and is illustrated as a reference. In step S150, the CPU specifies positions of the respective portions P1 to P9 corresponding to the focused parts on the basis of each frame of the body moving images, and estimates motions of the positions of the respective portions P1 to P9 on the basis of the motions of the head detected in step S130.

As a technique for recognizing each focused part in a frame, a so-called pattern recognition is employed. In a case where there is a focused part which is not reflected in a frame, the focused part is obtained through prediction. The body imaging cameras 62 and 63 which acquire the body moving images are fixed to the head mounted display 100 to which the nine-axis sensor 66 is also fixed, and thus performs the same motion as that of the nine-axis sensor 66. On the other hand, since two-dimensional coordinates (the X axis direction and the Y axis direction) of the respective portions P1 to P9 can be obtained from each frame, and the two body imaging cameras 62 and 63 are present on the left and right sides, it is possible to obtain positions (downward) of the respective portions P1 to P9. Therefore, motions of the positions of the respective portions P1 to P9 in the X axis direction, the Y axis direction, and the Z axis direction can be estimated on the basis of the motions of the head detected in step S130. The motion mentioned here indicates a positional movement (a position, velocity, and acceleration) and a direction of the head. The motion of the head obtained in the above-described manner is stored in the DRAM of the storage unit 120.

After step S150 of FIG. 5 is executed, the CPU creates an illustration moving image when the user makes turns on the basis of the motion of the head detected in step S130 and the motion of each focused part extracted in step S150 (step S160).

Figures 8, 9:
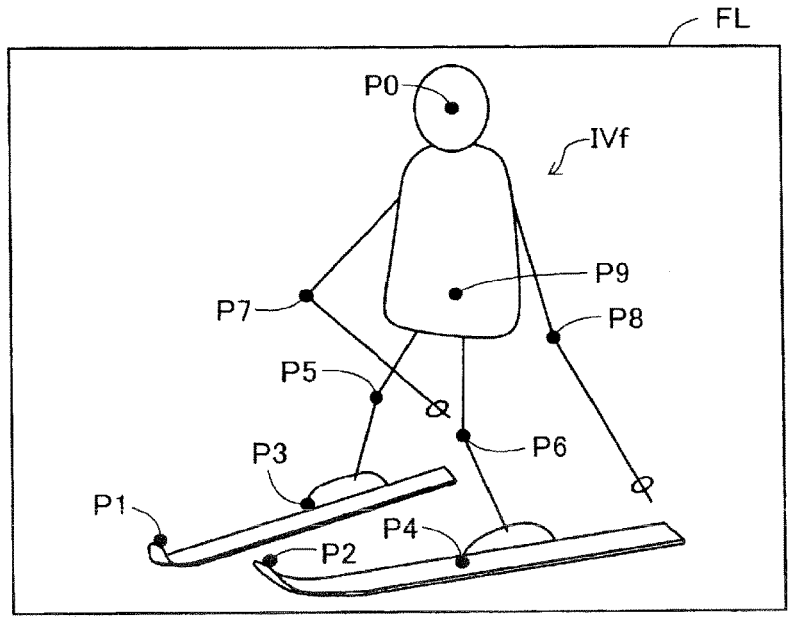
FIG. 8 is a diagram showing an example of an illustration moving image.
FIG. 9 is a diagram showing a data configuration of a model moving image storage database.

FIG. 8 is a diagram showing an example of an illustration moving image. The illustration moving image is a collection of a plurality of still images (frames) including line drawings IVf, and FIG. 8 shows a single frame FL. The line drawings IVf indicate a skiing person, and correspond to a 3D stereoscopic image. The line drawings IVf are created so that positions of the front end portion of the right ski, the front end portion of the left ski, the front end portion of the right ski boot, the front end portion of the left ski boot, the right knee portion, the left knee portion, the right wrist portion, the left wrist portion, and the navel portion of the person match the positions of the respective portions P1 to P9 stored in the storage unit 120 in step S150, and a position of the head of the person matches the position P0 of the head stored in the storage unit 120 in step S130. As a result, an illustration moving image which illustrates the body moving image of the user captured in step S120 is obtained. The obtained illustration moving image is stored in the DRAM of the storage unit 120 for each frame. The illustration moving image may be a 2D planar moving image instead of a 3D stereoscopic moving image.

After step S160 of FIG. 5 is executed, the CPU selects one record from the model moving image storage database 120a on the basis of the motion of the head detected in step S130 and the focused parts extracted in step S150 (step S170).

FIG. 9 is a diagram showing a data configuration of the model moving image storage database. The model moving image storage database 120a is a database which constitutes records by using three fields F1, F2 and F3 including "type", "teacher moving image data", and "head position/focused part data", and accumulates first to third records R1, R2 and R3 in the present embodiment. The first record R1 relates to a snowplough turn corresponding to an elementary skill level. The second record R2 relates to a stem turn corresponding to an intermediate skill level. The third record R3 relates to a parallel turn corresponding to an advanced skill level. Each of the "snowplough turn", the "stem turn", and the "parallel turn" corresponds to a type of "act of moving the body" in an aspect of the invention. The "act of moving the body" can also be said to be a "body motion", and can also be said to be a "motion performed by a human by using voluntary muscles".

A teacher who is an instructor has made each of the snowplough turn, the stem turn, and the parallel turn in advance, and an image obtained by imaging each operation with the imaging cameras is stored in the field F2 of "teacher moving image data". The teacher mounts six-axis sensors on the head and the respective portions P1 to P9 of the body when making the respective turns, and thus motions of the portions can be detected by using the six-axis sensors. The detected motion of the head and the detected motions of the respective portions P1 to P9 are stored in the field F3 of "head position/focused part data". The six-axis sensor is a motion sensor which detects acceleration (in three axes) and angular velocity (in three axes), and can detect motions of the head and the respective portions P1 to P9 even if there is no function of detecting geomagnetism unlike the nine-axis sensor 66. A nine-axis sensor may be used instead of the six-axis sensor. The model moving image storage database 120a corresponds to a "reference image storage unit" in an aspect of the invention.

In step S170, by using the motion of the head detected in step S130 and the focused parts extracted in step S150 as search keys, a record in which the content of the field F3 of "head position/focused part data" is closest to the search keys is selected from the three records R1 to R3. Specifically, the content of the field F3 of "head position/focused part data" is compared with the search keys, this comparison is performed for each focused part, and the "closest" relationship is satisfied when a sum total of deviations (deviated distances) for each focused part is smallest. A weighting factor may be changed depending on a focused part, a deviation may be multiplied by the weighting factor, and the "closest" relationship may be satisfied when a sum total of deviations is smallest. The motion of the head detected in step S130 and the focused parts detected in step S150, which are the search keys, are related to turns which have been previously made by the user, and, in step S170, a record for turns of the teacher which is closest to the turns is selected. For example, in a case where the user has made a snowplough turn previously, a record for turns of the teacher related to the snowplough turn is selected.

After step S170 of FIG. 5 is executed, the CPU determines whether or not an operation of selecting the option M2 (FIG. 6) of "reproduce" has been received in the control section 10 which is operated by the user (step S180). Here, if it is determined that the operation of selecting the option M2 of "reproduce" has been performed by the user and has been received, the CPU reads the illustration moving image of the user created in step S160 from the storage unit 120 and displays the image on the image display section 20 (step S190).

Figure 10:
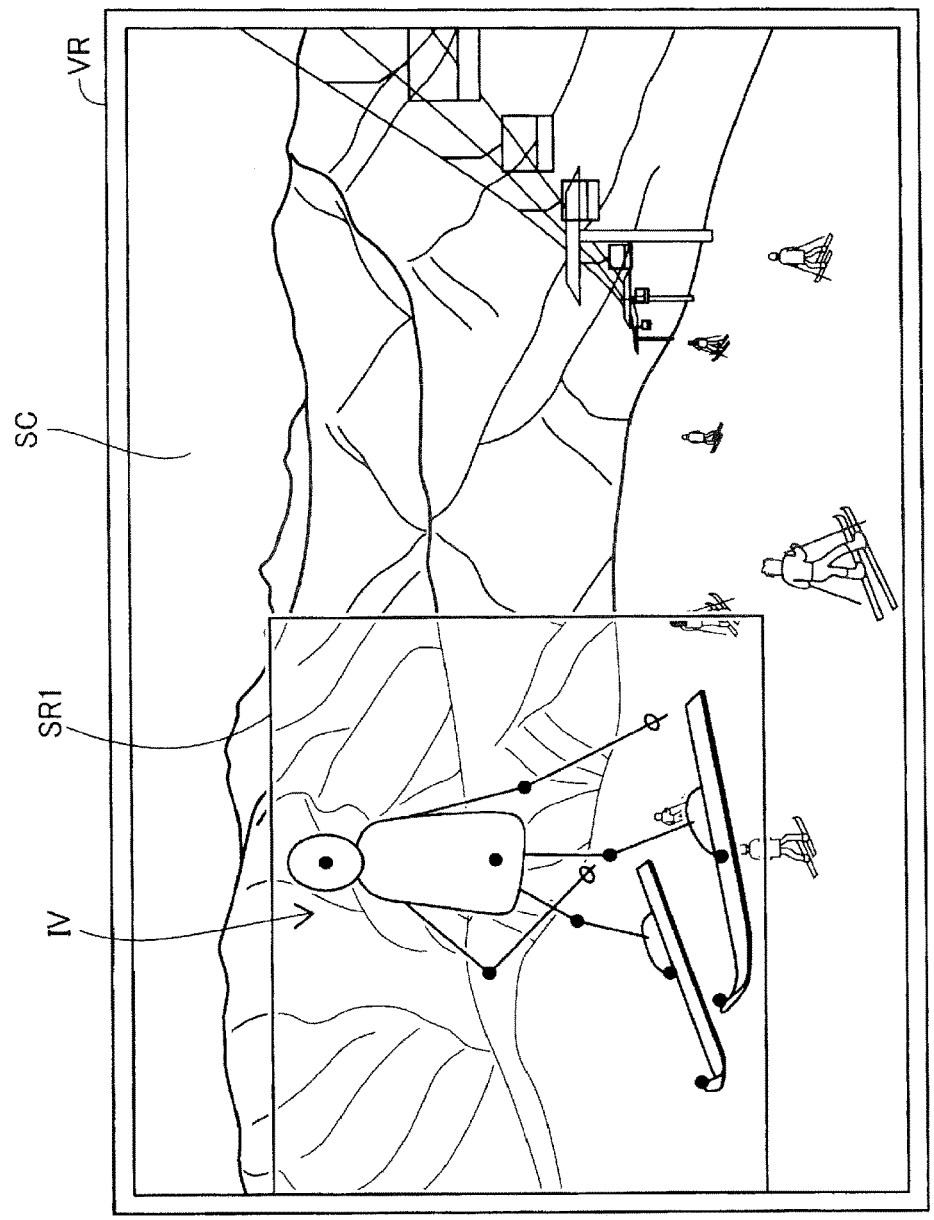
FIG. 10 is a diagram showing an example of a visual field after step S190 is executed.

FIG. 10 is a diagram showing an example of a visual field VR which is visually recognized by the user after step S190 is executed. As shown in FIG. 10, the user visually recognizes external scenery SC through the optical image display units 26 and 28 of the image display section 20. As a result of step S190, a reproduced screen SR1 is included in a part (for example, the left part) of the visual field VR. The illustration moving image of the user is displayed on the reproduced screen SR1. In other words, an illustration moving image IV formed by the line drawings IVf exemplified in FIG. 8 is displayed on the reproduced screen SR1. In the present embodiment, the external scenery SC is seen through the reproduced screen SR1, but, alternatively, the external scenery SC may not be seen therethrough. As a second stage of the ski lesson process, the user views turns of the user or turns of the teacher as a model, and can view the turns of the user in a form of the illustration moving image in step S190.

On the other hand, if a negative determination is performed in step S180 of FIG. 5, the CPU determines whether or not an operation of selecting the option M3 (FIG. 6) of "reproduce (with model)" has been received in the control section 10 which is operated by the user (step S200). Here, if it is determined that the operation of selecting the option M3 of "reproduce (with model)" has been performed by the user and has been received, the CPU reads teacher moving image data stored in the field F2 of "teacher moving image data" of the record selected in step S170 from the model moving image storage database 120a, and displays the teacher moving image data and the illustration moving image of the user created in step S160 on the image display section 20 (step S210). The process in step S150, the process in step S170, and the process until the teacher moving image data is read in step S210 correspond to processes performed by the model moving image acquisition unit 166 (FIG. 3).

Figure 11:
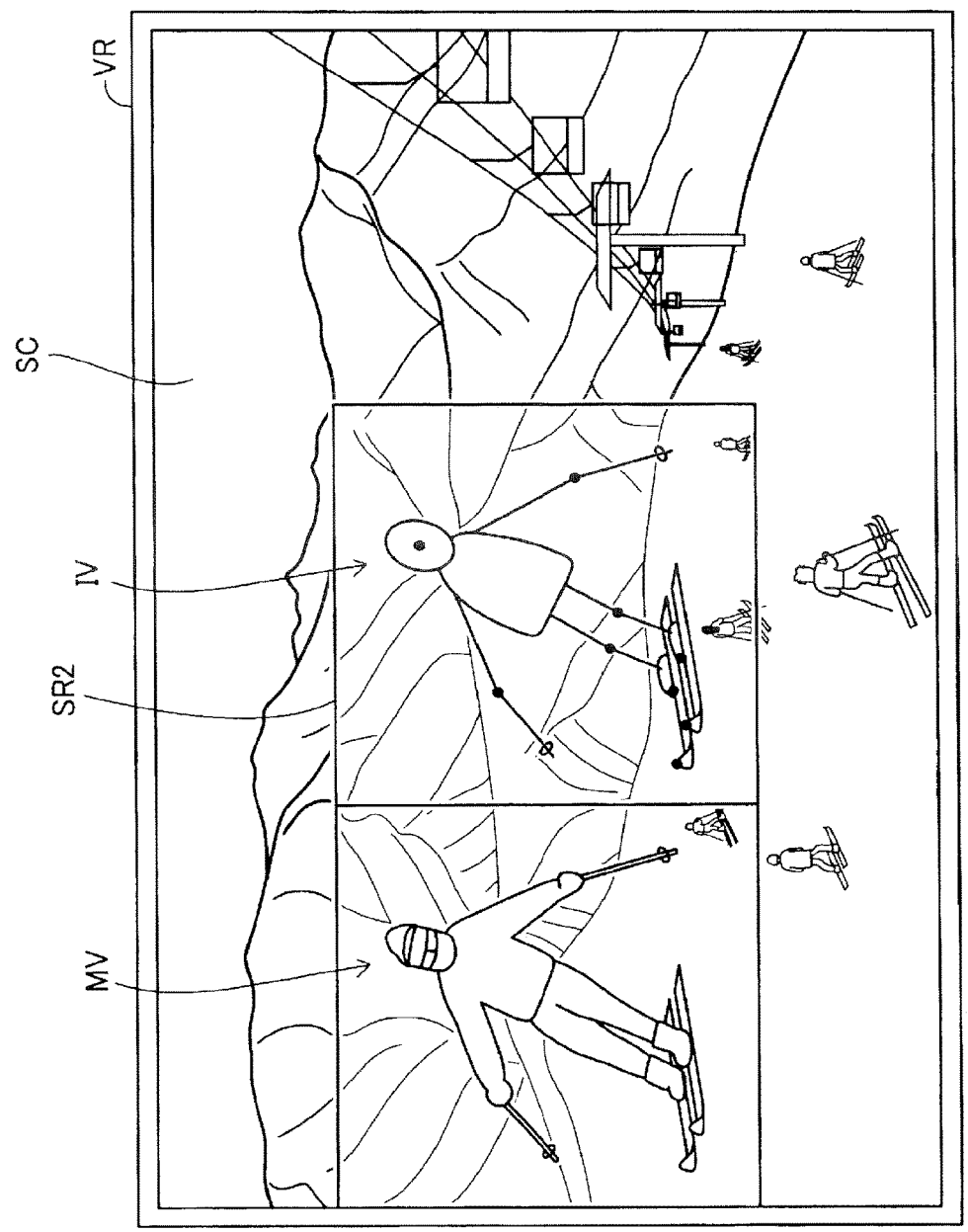
FIG. 11 is a diagram showing an example of a visual field after step S210 is executed.

FIG. 11 is a diagram showing an example of a visual field VR which is visually recognized by the user after step S210 is executed. As shown in FIG. 11, the user visually recognizes external scenery SC through the optical image display units 26 and 28 of the image display section 20. As a result of step S190, a reproduced screen SR2 is included in a part (for example, a left portion) of the visual field VR. The illustration moving image IV of the user and a teacher moving image MV based on the teacher moving image data are displayed in parallel to each other on the reproduced screen SR2. In the present embodiment, the external scenery SC is seen through the reproduced screen SR2, but, alternatively, the external scenery SC may not be seen therethrough. As the second stage of the ski lesson process, the user can view both the turns of the user and the turns of the teacher as a model.

On the other hand, if a negative determination is performed in step S200 of FIG. 5, the CPU determines whether or not an operation of selecting the option M4 (FIG. 6) of "reproduce model" has been received in the control section 10 which is operated by the user (step S220). Here, if it is determined that the operation of selecting the option M4 of "reproduce model" has been performed by the user and has been received, the CPU reads teacher moving image data stored in the field F2 of "teacher moving image data" of the record selected in step S170 from the model moving image storage database 120a, and displays the teacher moving image data on the image display section 20 as a model moving image (step S230). As a result of step S230, in the visual field VR shown in FIG. 10, the teacher moving image MV shown in FIG. 11 is displayed on the reproduced screen SR1 instead of the illustration moving image IV of the user.

If a negative determination is performed in step S220 of FIG. 5, the CPU returns the flow to the process in step S100, and the processes in steps S100 to S230 are repeatedly performed. Also after steps S190, S210 and S230 are completed, the CPU returns the flow to the process in step S100, and the processes in steps S100 to S230 are repeatedly performed. Consequently, the temporarily created illustration moving image or the acquired teacher moving image can be reproduced many times until the next recording is performed.

A-3. Effects

As described above in detail, according to the head mounted display 100 of the present embodiment, one record is selected from the model moving image storage database 120a on the basis of motions of the body of the user from the shoulders to the lower portions when the user initially makes turns, imaged by the right and left body imaging cameras 62 and 63, and a motion of the head when the user makes turns, detected by the nine-axis sensor 66, and teacher moving image data stored in the record is displayed on the image display section 20. Consequently, if the user has to perform only a simple operation such as selecting the option M3 of "reproduce (with model)" or the option M4 of "reproduce model", the user can view a teacher moving image MV of the same type as the type when initially making turns, on the image display section 20. Therefore, the head mounted display 100 achieves an effect that a model moving image suitable for the turn type which is desired to be practiced can be displayed without performing complex operations.

According to the head mounted display 100, in a case where an operation of selecting the option M3 of "reproduce (with model)" is performed, the illustration moving image IV of the user, created on the basis of motions of the head of the user, and the shoulders and the lower portions thereof is displayed on the image display section 20 along with the teacher moving image MV. For this reason, the user can compare and view the illustration moving image IV regarding skiing of the user and the teacher moving image MV, and thus it is possible to increase a learning effect.

A-4. Modification Examples

Modification Examples of the first embodiment will be described below.

First Modification Example of First Embodiment

In the first embodiment, when the option of "reproduce (with model)" is selected, the illustration moving image IV of the user and the teacher moving image MV are displayed in parallel to each other on the reproduced screen SR2 (FIG. 11), but, alternatively, both of the images may be displayed in an overlapping manner.

Figure 12:
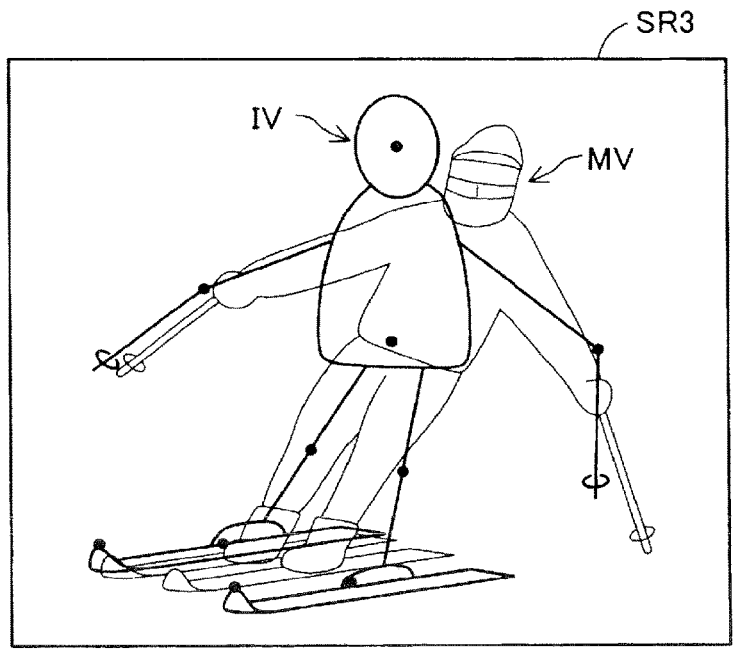
FIG. 12 is a diagram showing a display example of a reproduction screen according to a first modification example of a first embodiment.

FIG. 12 is a diagram showing an example of display of a reproduced screen SR3 in the first modification example of the first embodiment. The illustration moving image IV and the teacher moving image MV are displayed on the reproduced screen SR3 in an overlapping manner. Consequently, the user can easily compare the illustration moving image regarding skiing of the user with the teacher moving image, and thus it is possible to further increase a learning effect. In addition, in this modification example, in a case where a predetermined part (for example, a position corresponding to the above-described P0 or P1) in the illustration moving image IV of the user has a difference with a predetermined level or more at the same position in the teacher moving image MV, a marker or the like may be attached to the part so as to invite a user's attention. According to this configuration, it is possible to further increase a learning effect.

Second Modification Example of First Embodiment

In the first embodiment, the teacher moving image MV displayed on the image display section 20 is obtained by imaging the teacher with the imaging cameras in advance. In contrast, in the second modification example, an illustration moving image which represents a motion of the teacher by using line drawings is used as a teacher moving image. For example, when the model moving image storage database 120a of FIG. 9 is created, a motion of the head and motions of the respective portions P1 to P9 are stored in the field F3 of "head position/focused part data", and an illustration moving image of the teacher is created in the same manner as when creating the illustration moving image of the user in the first embodiment by using such motion data. According to this configuration, the user can view a teacher moving image in a form of line drawings illustrated in the same manner as in the illustration moving image of the user.

Third Modification Example of First Embodiment

In the first embodiment, a motion of each focused part of the user is estimated on the basis of a body moving image obtained by using the body imaging cameras 62 and 63 and a motion of the head imaged by the nine-axis sensor 66. Alternatively, in the third modification example, the body imaging cameras 62 and 63 are omitted, six-axis sensors are respectively mounted on the respective portions P1 to P9 as focused parts, and motions of the focused parts are obtained on the basis of detection results of the six-axis sensors. Each of the six-axis sensors and the control section 10 are connected to each other by using a wireless communication path such as a wireless LAN or Bluetooth (registered trademark). Other configurations are the same as those in the first embodiment. According to the third modification example with this configuration, it is possible to achieve the same effect as in the first embodiment.

Fourth Modification Example of First Embodiment

In the first embodiment, a motion of each focused part of the user is estimated on the basis of a body moving image obtained by using the body imaging cameras 62 and 63 and a motion of the head imaged by the nine-axis sensor 66. Alternatively, in the fourth modification example, a motion of each focused part of the user may be estimated only by using the body imaging cameras 62 and 63.

Fifth Modification Example of First Embodiment

In the first embodiment, both a head position and focused parts are used as search keys for the model moving image storage database 120a, but, alternatively, only the focused parts may be used. In this case, motions of the focused parts are estimated on the basis of only moving images of the body of the user from the shoulders to the lower portions, captured by the body imaging cameras 62 and 63, and an illustration moving image of the user is created on the basis of the motions of the focused parts. Also in the fifth modification example with this configuration, it is possible to achieve the same effect as in the first embodiment.

Sixth Modification Example of First Embodiment

In the first embodiment, the body imaging cameras 62 and 63 are installed at both ends of the spectacle portion which supports the optical image display units 26 and 28, but, alternatively, may be installed at other positions of the spectacle portion, that is, the temples. In addition, the body imaging cameras 62 and 63 may be installed at positions spaced apart from the spectacle portion, for example, a cap, or a helmet which may be included in a set. The body imaging cameras 62 and 63 are installed in the spectacle portion which supports the image display section so that imaging directions thereof are downward directions, but may be alternatively installed so that imaging directions are other directions such as a front direction (a direction of the image display section 20). In a case of the front direction, the body imaging cameras have superwide angle lenses and can thus image motions of the body of the user from the shoulders to the lower portions.

B. SECOND EMBODIMENT

Next, a second embodiment of the invention will be described. In the second embodiment, the invention is used for a golf lesson. A head mounted display of the second embodiment includes a control section and an image display section in the same manner as in the first embodiment. Other configurations of the image display section of the second embodiment are the same as those of the image display section 20 of the first embodiment except that the right body imaging camera 62 and the left body imaging camera 63 are omitted. In addition, the head mounted display of the second embodiment includes a six-axis sensor mounted on a golf club.

Figure 13:
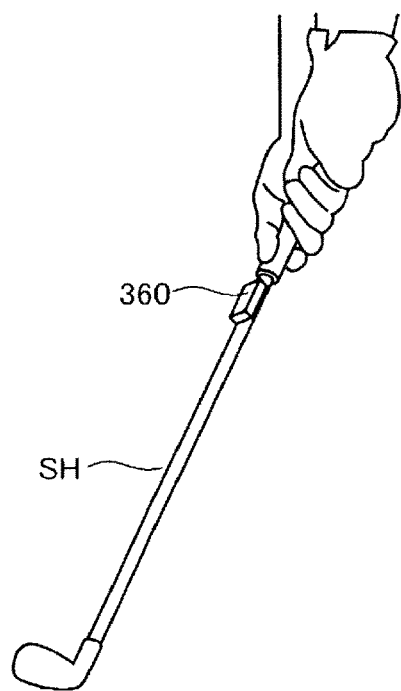
FIG. 13 is a diagram showing a use state of a six-axis sensor in a second embodiment.

FIG. 13 is a diagram showing a state in which a six-axis sensor is used. As shown in FIG. 13, a six-axis sensor 360 is provided on a shaft SH of a golf club. The six-axis sensor 360 is a motion sensor which detects acceleration (in three axes) and angular velocity (in three axes) as described above. The six-axis sensor 360 and the control section are connected to each other by using wireless communication.

The control section includes a model moving image storage database in the same manner as in the first embodiment. The model moving image storage database of the present embodiment is used for a golf lesson, and has a data configuration shown in FIG. 14. The model moving image storage database 220a is a database which records by using three fields F11, F12 and F13 including "type", "teacher moving image data", and "swing data", and accumulates first to third records R11, R12 and R13 in the present embodiment. The first record R11 relates to an approach shot; the second record R12 relates to an iron shot; and the third record R13 relates to a driver shot. Each of the "approach shot", the "iron shot", and the "driver shot" corresponds to a type of "act of moving the body" in an aspect of the invention.

A teacher who is a instructor has made each of the approach shot, the iron shot, and the driver shot in advance, and an image obtained by imaging each operation with the imaging cameras is stored in the field F12 of "teacher moving image data". The teacher installs the six-axis sensor on the shaft of the golf club during shots, and thus a motion of the installation portion is detected by the six-axis sensor. A detected motion of the installation portion is stored in a field F13 of "swing data".

Also in the second embodiment, in the same manner as in the first embodiment, first, the user makes a type of act which is desired to be practiced, that is, a predetermined type of golf swing. In this case, the golf swing is performed after the six-axis sensor 360 is mounted on the shaft SH as shown in FIG. 13. Detection data from the six-axis sensor 360 is sent to the control section. The control section searches the model moving image storage database 220a by using the detection data as a search key. Specifically, a record in which the content of the field F13 of "swing data" is closest to the search key is selected from the three records R11 to R13 accumulated in the model moving image storage database 220a. In addition, teacher moving image data included in the selected record is read from the model moving image storage database 220a and is displayed on the image display section. As an aspect of the display, in the same manner as in the first embodiment, only a teacher moving image may be displayed, or may be displayed in parallel to a user moving image or so as to overlap the user moving image.

According to the head mounted display with the above-described configuration of the second embodiment, if the user has only to perform a simple operation, the user can view a teacher moving image of the same type as the type when initially performing golf swing, on the image display section. For example, in a case where the user performs golf swing on iron shots previously, a teacher moving image regarding the iron shot is displayed on the image display section. Therefore, the head mounted display 100 achieves an effect in which a model moving image suitable for the golf swing type which is desired to be practiced can be displayed without performing complex operations.

As a first modification example of the second embodiment, there may be a configuration in which a calculation process for specifying an inner force which is generated by swing is performed according to a three-dimensional double pendulum model built in a golf club and upper body's portions of the user on the basis of a detection result from the six-axis sensor 360. The three-dimensional double pendulum model uses a virtual line which connects a center of a line connecting both the shoulders of the user to each other, to a grip portion of the golf club held by the user, as a part of the model. Details of the calculation process are disclosed in JP-A-2013-90862, and detailed description thereof will be omitted. In addition, the specified inner force is illustrated, and is displayed on the image display section. An inner force generated by golf swing of the teacher is also specified, and the specified inner force is illustrated and is displayed on the image display section. According to this configuration, an inner force generated by golf swing can be illustrated and displayed, and thus it is possible to increase a learning effect.

As a second modification example of the second embodiment, a wrist watch or a wrist band into which a six-axis sensor is built may be prepared, and the six-axis sensor may be used instead of a six-axis sensor mounted on a golf club. Also with this configuration, it is possible to achieve the same effect as in the second embodiment.

C. THIRD EMBODIMENT

In a third embodiment, the head mounted display 100 of the first embodiment is used for a golf lesson without change. The third embodiment can be handled if the model moving image storage database 120a shown in FIG. 9 has only to be changed for use in golf. FIG. 15 is a diagram showing a data configuration of a model moving image storage database 320a for use in golf. When compared with the model moving image storage database 220a shown in FIG. 14, the model moving image storage database 320a for use in golf is different in a field F23 of "head position/focused part data" and is the same in a field F11 of "type" and a field F12 of "teacher moving image data". Data regarding the teacher who has performed golf swing, which is the same as in the first embodiment (here, the focused part is a part suitable for golf swing), is stored in the field F23 of "head position/focused part data". Also with this configuration, it is possible to display a model moving image suitable for the golf swing type which is desired to be practiced without performing complex operations.

D. FOURTH EMBODIMENT

In a fourth embodiment, the invention is used for a golf lesson in the same manner as in the second and third embodiments. A head mounted display of the fourth embodiment includes a control section and an image display section in the same manner as in the first embodiment. Other configurations of the image display section of the fourth embodiment are the same as those of the image display section 20 of the first embodiment except that the right body imaging camera 62 and the left body imaging camera 63 are omitted. The control section of the fourth embodiment has a model moving image storage database in the same manner as in the first embodiment.

Figures 16, 17:
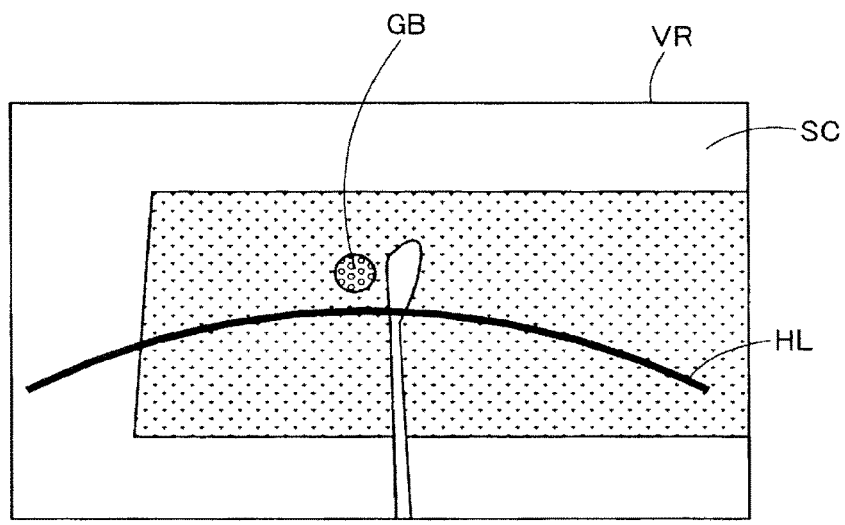
FIG. 16 is a diagram showing a data configuration of a model moving image storage database in a fourth embodiment.
FIG. 17 is a diagram showing an example of a visual field in the fourth embodiment.

FIG. 16 is a diagram showing a data configuration of a model moving image storage database 420a in the fourth embodiment. As shown in FIG. 16, the model moving image storage database 420a is a database which constitutes records by using three fields F11, F32 and F33 including "type", "teacher moving image data", and "ball/head relative position data". Data items for discriminating an "approach shot", an "iron shot", and a "driver shot" are stored in the field F11 of "type" in the same manner as in the model moving image storage database 320a of the third embodiment.

A teacher who is a instructor has made each of the approach shot, the iron shot, and the driver shot in advance, and an image obtained by imaging each operation with the external scenery imaging camera 61 is stored in the field F32 of "teacher moving image data". In a case where a golf ball is shot, since a trajectory of a head of a golf club as a focused part of golf swing can be imaged by the external scenery imaging camera 61 which images a visual line direction of the user, in the present embodiment, a moving image captured by the external scenery imaging camera 61 is stored in the field F32 of "teacher moving image data". Consequently, an image regarding a motion of the golf club (particularly, the head thereof) which is a tool bundled with the body of the teacher is stored as a reference image. In addition, relative positions between the head and the golf ball are detected from each frame of the moving images, and the detected relative positions for each frame are stored in the field F33 of "ball/head relative position data".

Also in the fourth embodiment, in the same manner as in the first to third embodiments, first, the user makes a type of act which is desired to be practiced, that is, a predetermined type of golf swing. In this case, the control section performs imaging with the external scenery imaging camera 61, and detects relative positions between the head and the golf ball from each frame of moving images obtained through imaging. The control section searches the model moving image storage database 420a by using a variation in the detected relative positions as a search key. Specifically, a record in which the content of the field F33 of "ball/head relative position data" is closest to the search key is selected from the three records R11 to R13 accumulated in the model moving image storage database 420a. In addition, teacher moving image data included in the selected record is read from the model moving image storage database 420a and is displayed on the image display section 20. As an aspect of the display, in the same manner as in the first embodiment, only a teacher moving image may be displayed, or may be displayed in parallel to a user moving image or so as to overlap the user moving image.

FIG. 17 is a diagram showing an example of a visual field VR which is visually recognized by the user. As shown in FIG. 17, the user visually recognizes the shaft and the head of the golf club addressed by the user as external scenery SC seen through the optical image display units 26 and 28 of the image display section 20. In the present embodiment, a head trajectory line HL which is an augmented reality (AR) image overlaps the external scenery SC. Specifically, a position of a golf ball GB is specified in the visual field VR; a display position of the head trajectory line HL is calculated on the basis of relative position data stored in the field F33 of "ball/head relative position data" included in the record selected through the above-described search and the position of the golf ball GB; and the head trajectory line HL is displayed at the calculated display position. As the display timing, for example, the head trajectory line HL is displayed at all times after a type of golf swing which is desired to be learnt is performed.

According to the head mounted display with the above-described configuration of the fourth embodiment, if the user has only to perform a simple operation, the user can view a teacher moving image of the same type as the type of shot when initially performing golf swing, that is, reference images from an address to an impact, on the image display section. Therefore, the head mounted display 100 achieves an effect that a reference image suitable for the golf swing type which is desired to be practiced can be displayed without performing complex operations. According to the head mounted display of the fourth embodiment, since the head trajectory line HL obtained from the teacher moving image can also be displayed as an AR image in the visual field VR in which the user performs an address, it is possible to further increase a teaching effect without performing complex operations.

In the fourth embodiment, the external scenery imaging camera 61 constitutes at least a part of the "body motion detection unit". In contrast, as a modification example of the fourth embodiment, a wrist watch type camera may be prepared, and the wrist watch type camera may constitute at least a part of the "body motion detection unit".

Figure 18:
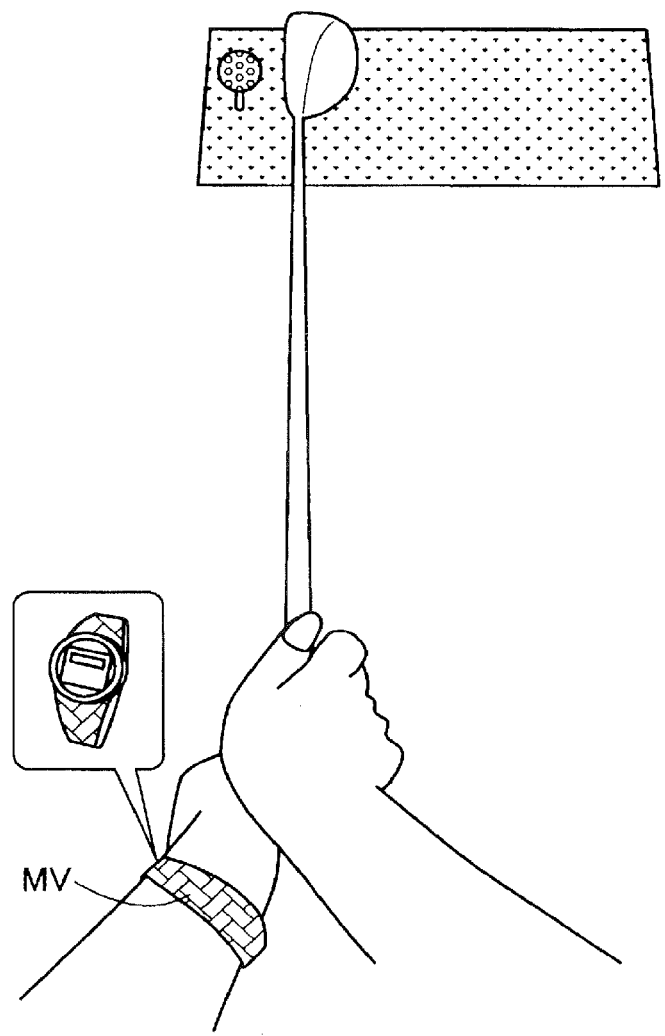
FIG. 18 is a diagram showing a wrist watch type camera.

FIG. 18 is a diagram showing a wrist watch type camera WV. When the user performs an address in a state of wearing the wrist watch type camera WV, the wrist watch type camera WV has an angle of view for imaging the head vicinity and can thus capture a moving image and a still image. The wrist watch type camera WV and the control section of the head mounted display are connected to each other through wireless communication. Also with the configuration of using the wrist watch type camera, it is possible to achieve the same effect as in the fourth embodiment.

The wrist watch type camera may be mounted not on the user's arm but on the lawn so as to image the user. Instead of the wrist watch type camera, a camera may be built into a pendant, a ring, a smartphone, or the like.

E. FIFTH EMBODIMENT

Figure 19:
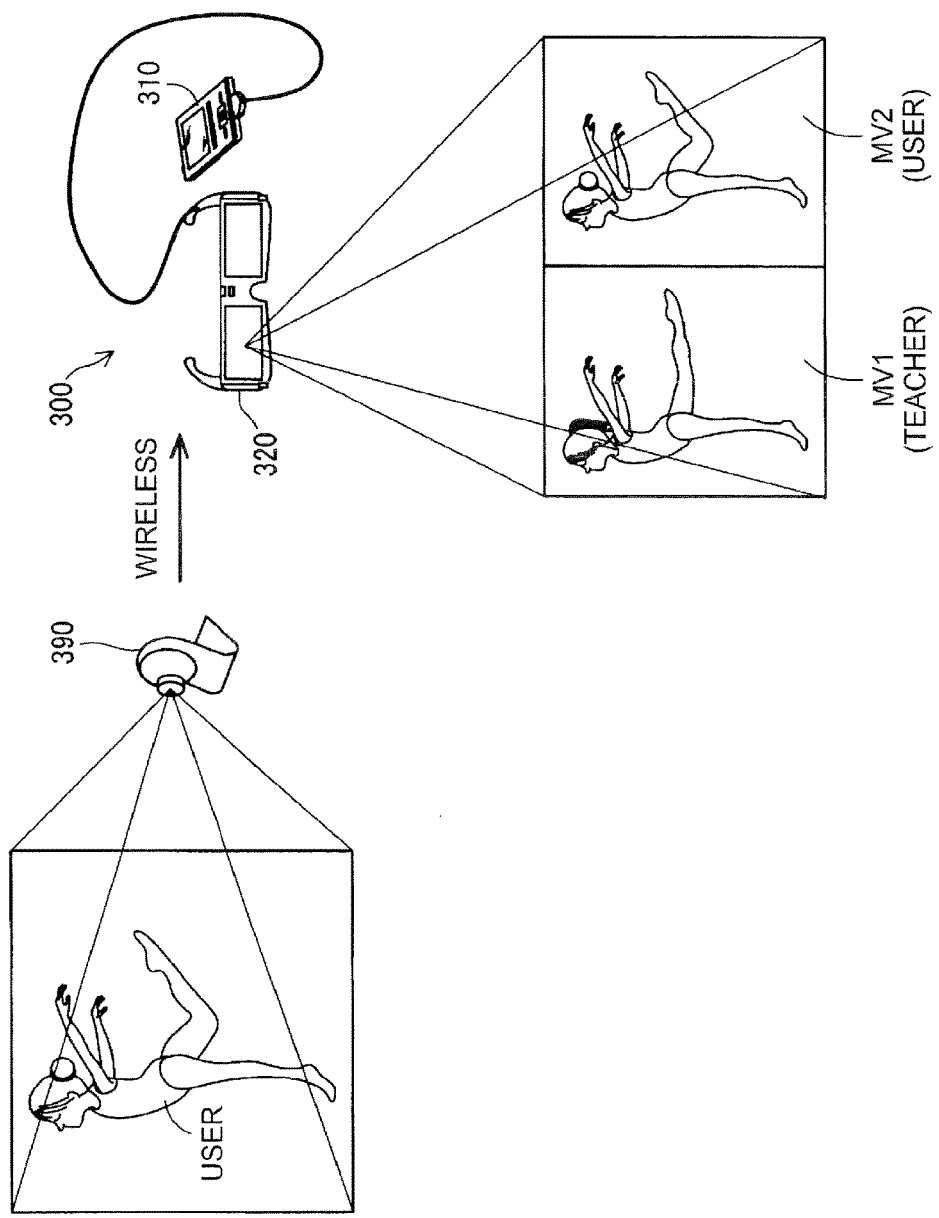
FIG. 19 is a diagram showing a schematic configuration of a head mounted display according to a fifth embodiment.

FIG. 19 is a diagram showing a schematic configuration of a head mounted display 300 according to a fifth embodiment. In the fifth embodiment, the invention is used for a ballet lesson. The head mounted display of the fifth embodiment includes a control section 310 and an image display section 320 in the same manner as in the first embodiment. Other configurations of the image display section 320 are the same as those of the image display section 20 of the first embodiment except that the right body imaging camera 62 and the left body imaging camera 63 are omitted. In addition, the head mounted display 300 of the fifth embodiment includes an external camera 390. The external camera 390 is a web camera which is separated from the image display section 320 and is disposed at a position where the whole body of the user can be imaged, and is connected to the control section 310 by using wireless communication. The external camera 390 may be replaced with a wireless connection camera other than a web camera. The camera may be connected not by using wireless communication but by using wired communication.

The control section includes a model moving image storage database in the same manner as in the first embodiment. The model moving image storage database is constituted by three fields including "type", "teacher moving image data", and "head position/focused part data" in the same manner as in the first embodiment (refer to FIG. 9). The model moving image storage database of the fifth embodiment is used for ballet, and the type of step, a number, or the like is stored in the field of "type". Teacher moving image data and head position/focused part data are created in the same manner as in the first embodiment. A focused part is a part suitable for ballet.

Also in the fifth embodiment, in the same manner as in the first embodiment, first, the user makes a type of act which is desired to be practiced, that is, a predetermined type of dance of ballet. At this time, this dance is imaged by the external camera 390. The control section receives moving images captured by the external camera 390, and estimates motions of the head and focused parts from each frame of the captured moving images. As a technique for recognizing each focused part in a frame, so-called pattern recognition is employed. In a case where there is a focused part which is not reflected in a frame, the focused part is obtained through prediction.

The above-described model moving image storage database is searched by using head position/focused part data of the user obtained in the above-described manner as a search key. Specifically, a record in which the content of the field of "head position/focused part data" is closest to the search key is selected from the records accumulated in the model moving image storage database. In addition, teacher moving image data included in the selected record is read from the model moving image storage database and is displayed on the image display section 320. As an aspect of the display on the image display section 320, as shown in FIG. 19, a teacher moving image MV1 is displayed in parallel to a user moving image MV2 which is the captured moving image obtained by the external camera 390. Instead of the parallel display, the user moving image MV2 and the teacher moving image MV1 may be displayed in an overlapping manner. Only the user moving image MV2 may be displayed.

According to the head mounted display 300 with the above-described configuration of the fifth embodiment, if the user has only to perform a simple operation, the user can view a teacher moving image of the same type as the type when initially performing a dance of ballet, on the image display section. Therefore, the head mounted display 300 achieves an effect that a model moving image suitable for the dance of ballet which is desired to be practiced can be displayed without performing complex operations.

F. MODIFICATION EXAMPLES

The invention is not limited to the above-described first to fifth embodiments or modification examples thereof, and may be implemented in various aspects within the scope without departing from the spirit thereof. For example, the following modifications may also occur.

Modification Example 1

In the above-described embodiments or modification examples, a captured moving image of the teacher is prepared as a model moving image stored in the model moving image storage database, but, alternatively, a moving image obtained by imaging the user who becomes skillful may be prepared. In other words, any moving image may be used as long as the moving image (reference image) represents a motion of the body as a reference of an act. In addition, a reference image is not limited to a moving image showing a motion of the body, and may be a moving image showing a motion of a tool bundled with the body, as exemplified in the fourth embodiment. A reference image is not limited to a moving image, and may be a set of a plurality of still images or a single still image, which is stored in the model moving image storage database for each type of act. A reference image may be, for example, a demonstration image, a live performance image, a scenario image, or a model image.

Modification Example 2

In the above-described embodiments or modification examples, acts of moving the body have exemplified an act related to skiing, an act related to golf, and an act related to ballet, but are not limited thereto. For example, acts of moving the body may be, for example, acts related to martial arts, fencing, judo, snowboarding, gymnastics, tea ceremony, flower arrangement, theater, lacquer crafts, plastering, electrical work, Japanese dressmaking, tailoring, cooking, character learning (stroke order, form), and language learning. In addition, as a model moving image stored in the model moving image storage unit, a combination of a plurality of items, such as a combination of a moving image regarding skiing and a moving image regarding snowboarding, may be stored.

Modification Example 3

In the above-described embodiments or modification examples, the model moving image storage database is provided in the control section of the head mounted display, but, alternatively, the database may be provided externally. A server including the model moving image storage database is provided externally, and the server and the control section of the head mounted display are connected to each other via a network. The control section sends the motion of the head and the motions of the focused parts, obtained in step S150 of FIG. 5, to the server side, and the server performs the search in step S170. According to this configuration, it is possible to each update, delete, and change the model moving image storage database.

Modification Example 4

In the above-described embodiments or modification examples, the body motion detection unit includes the body imaging camera, the motion sensor, or the external camera, but is not limited thereto. For example, an electromyograph may be used instead of the motion sensor. The electromyograph causes a current to flow through an installation part so as to detect a generated voltage value, and thus specifies extension and contract of muscles for moving the part. A motion of muscles or skeletons can be detected by the electromyograph and can thus be compared with a target motion. That is, the body motion detection unit may include any sensor as long as the sensor can detect a motion of the user's body, or at least a part of tool such as a ski or a golf club bundled with the body. In addition, the body motion detection unit may also include a physical activity meter or a sensor which detects a state of the body such as heartbeats or breathing. The physical activity meter, the sensor detecting heartbeats, or the like may be built into a wrist watch or a ring, or may be attached to the skin. With this configuration, it is possible to announce "breathe more slowly", or "relax your upper body", by using an image or voice. The body motion detection unit may include a depth sensor. The depth sensor is a kind of depth (distance) sensor. As described above, the body motion detection unit may include a single sensor and may include a plurality of sensor. For example, the body motion detection unit may include a combination of a physical activity meter, a displacement sensor, an electromyograph, a GPS, and the like.

Modification Example 5

In the above-described embodiments or modification examples, the teacher moving image data acquired from the model moving image storage database is displayed on the image display section as a model moving image without changes (step S230 of FIG. 5), but, alternatively, consecutive images may be created on the basis of the teacher moving image data, and the consecutive images may be displayed.

Figure 20:
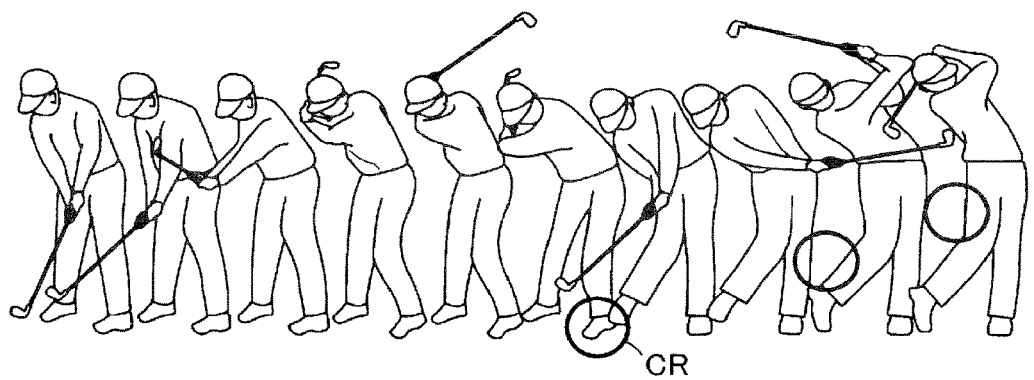
FIG. 20 is a diagram showing an example of consecutive images in Modification Example 5.

FIG. 20 is a diagram showing an example of consecutive images. A frame image is extracted for each frame from the teacher moving image data which is acquired from the model moving image storage database, and the frame images are displayed so as to overlap each other in a state of being slightly deviated, so that consecutive images can be displayed. In addition, an illustration moving image regarding a motion of the user may be compared with a teacher moving image, and notification graphics (for example, a circle) CR may be displayed at parts where there is a great difference between both of the images. Instead of the configuration in which graphics are displayed, for example, a notification that "the position of the left heel is considerably deviated" may be performed, or, for example, text such as "the position of the left heel is considerably deviated" may be displayed.

The similarity based on a difference between feature points of an illustration moving image and a teacher moving image is obtained as an index of ability evaluation, and the index may be displayed as a score (for example, 70 points or 100 points). An act may be divided into items such as a motion speed, a form, and quality of the act, so as to be evaluated.

Modification Example 6

In the above-described embodiments or modification examples, a single model moving image is acquired from the model moving image storage database by using a search key, but, alternatively, a plurality of model moving images which are hit by a search key may be acquired from the model moving image storage database.

Modification Example 7

In the above-described embodiments, the operation unit 135 is provided in the control section 10, but various modifications may occur in an aspect of the operation unit 135. For example, there may be an aspect in which there is a user interface as the operation unit 135 separately from the control section 10. In this case, the operation unit 135 is provided separately from the control section 10 including the power supply 130 and the like and can thus be miniaturized, and thus a user's operability is improved. In addition, if a nine-axis sensor which detects a motion of the operation unit 135 is provided in the operation unit 135, and various operations are performed on the basis of a detected motion, the user can intuitively operate the head mounted display 100.

Other Modification Examples

For example, the image light generation unit may include an organic electroluminescent (EL) display and an organic EL controller. For example, the image light generation unit may include liquid crystal on silicon (LCOS; LCoS is the registered trademark), a digital micromirror device, or the like instead of the LCD. For example, the invention is applicable to a laser retinal projective head mounted display.

For example, the head mounted display may be implemented in an aspect in which the optical image display units cover only part of the eyes of the user; in other words, the optical image display units do not completely cover the eyes of the user. The head mounted display may be a so-called monocular head mounted display.

The configuration of the head mounted display 100 in the above-described embodiment is only an example and may have various modifications. For example, either the direction key 16 or the track pad 14 provided in the control section 10 may be omitted, or other operation interfaces such as an operation stick may be provided in addition to the direction key 16 or the track pad 14 or instead of the direction key 16 or the track pad 14. The control section 10 may be configured to be coupled to input devices such as a keyboard or a mouse, and may receive an input from the keyboard or the mouse.

As an image display section, instead of the image display section 20 which is mounted like spectacles, other types of image display sections such as an image display section which is mounted like a hat may be employed. The earphones 32 and 34 may be omitted as appropriate.

In the above-described embodiments, the head mounted display 100 may guide image light showing the same image to the left and right eyes of the user so that the user visually recognizes two-dimensional images, and may guide image light showing different images to the left and right eyes of the user so that the user visually recognizes three-dimensional images.

In the above-described embodiments, some of the constituent elements implemented in hardware may be implemented in software, and, conversely, some of the constituent elements implemented in software may be implemented in hardware. For example, in the above-described embodiments, the image processing unit 160 or the sound processing unit 170 is implemented by the CPU 140 reading and executing a computer program, but these function units may be implemented by a hardware circuit.

In a case where some or all of the functions of the invention are implemented in software, the software (computer program) may be provided in a form of being stored on a computer readable recording medium. In the invention, the "computer readable recording medium" is not limited to a portable recording medium such as a flexible disc or a CD-ROM, and includes an internal storage device of a computer, such as various RAMS or ROMs, an external storage device fixed to a computer, such as a hard disk.

In the above-described embodiments, as shown in FIGS. 1 and 2, the control section 10 and the image display section 20 are provided separately from each other, but a configuration of the control section 10 and the image display section 20 is not limited to and may have various modifications. For example, all of the constituent elements of the control section 10 may be provided in the image display section 20, or some of the constituent elements may be provided therein. The power supply 130 in the above-described embodiments may be provided separately so as to be exchangeable, and a constituent element provided in the control section 10 may be doubly provided in the image display section 20. For example, the CPU 140 shown in FIG. 3 may be provided in both the control section 10 and the image display section 20, and the CPU 140 provided in the control section 10 and a CPU provided in the image display section 20 may execute different functions. In addition, there may be an aspect in which the control section 10 and the image display section 20 are integrally formed and function as a wearable computer which is mounted on clothes of a user.

The invention is not limited to the above-described embodiments or modification examples, and may be implemented by using various configurations within the scope without departing from the spirit thereof. For example, the embodiments corresponding to technical features of the respective aspects described in Summary of Invention and the technical features in the modification examples may be exchanged or combined as appropriate in order to solve some or all of the above-described problems, or in order to achieve some or all of the above-described effects. In addition, unless the technical feature is described as an essential feature in the present specification, the technical feature may be deleted as appropriate.

The entire disclosure of Japanese Patent Application Nos. 2014-117563, filed Jun. 6, 2014 and 2015-009373, filed Jan. 21, 2015 are expressly incorporated by reference herein.

What is claimed is:

1. A head mounted display for supporting improvement in an act of moving a body, comprising:

an image display unit that transmits external scenery therethrough and forms an image;
a body motion detection unit that detects motions of a user and at least a part of a tool bundled with the body;
a reference image acquisition unit that accesses a reference image storage unit which stores a reference image used as a reference of the act for each type of acts, and acquires one or a plurality of reference images corresponding to a detection result from the body motion detection unit, wherein the acquisition of the one or plurality of reference images are based upon motion of the head of the user and a plurality of focused parts of a body moving image; and
a display control unit that causes the image display unit to form the acquired reference image,
wherein a content of data corresponding to the head of the user and the plurality of focused parts of the body moving image is compared with search keys, and a closest relationship is determined when a sum total of deviations for each focused part is smallest, the closest relationship being used by the reference image acquisition unit to acquire the one or plurality of reference images.

2. The head mounted display according to claim 1, wherein the reference image is an image showing a motion of the body.

3. The head mounted display according to claim 2, wherein the body motion detection unit includes a body imaging camera that is installed at a spectacle portion supporting the image display unit.

4. The head mounted display according to claim 3, wherein the body imaging camera is installed so that an imaging direction is a downward direction.

5. The head mounted display according to claim 2, further comprising:
a user moving image creation unit that creates an illustration moving image of the user on the basis of a detection result from the body motion detection unit,
wherein the reference image is a moving image, and
wherein the display control unit causes an illustration moving image of the user to be formed in addition to the reference image.

6. The head mounted display according to claim 2, wherein the body motion detection unit includes an external camera that is disposed at a position spaced apart from a spectacle portion supporting the image display unit and images the user.

7. The head mounted display according to claim 6, wherein the display control unit causes an image of the user captured by the external camera to be formed in addition to the reference image.

8. A head mounted display for supporting improvement in an act of moving a body, comprising:
an image display unit that transmits external scenery therethrough and forms an image;
a body motion detection unit that estimates a motion of a body of a user and at least a part of a tool bundled with the body;
a head motion detection unit that detects a motion of the head of the user, the motion of the head of the user including positional movement and shift angle of the head;
a reference image acquisition unit that accesses a reference image storage unit which stores a reference image used as a reference of the act for each type of acts, and acquires one or a plurality of reference images corresponding to a detection result from the body motion detection unit; and
a display control unit that causes the image display unit to form the acquired reference image, wherein a content of data corresponding to the head of the user and a plurality of focused parts of a body moving image is compared with search keys, and a closest relationship is determined when a sum total of deviations for each focused part is smallest, the closest relationship being used by the reference image acquisition unit to acquire the one or plurality of reference images.

9. The head mounted display according to claim 8, wherein the motion of the head is changed in synchronization with timing of a change of frames stored in a storage unit that stores detected motions of the body of the user.

10. The head mounted display according to claim 8, wherein each focused part of the plurality of focused parts is a focused part from a corresponding frame, and a motion of each focused part is estimated on the basis of the detected motion of the head of the user.

11. The head mounted display according to claim 8, wherein motions of positions in an X axis direction, Y axis direction and Z axis direction are estimated on the basis of the detected motion of the head of the user.

12. The head mounted display according to claim 8, wherein the reference image is an image showing a motion of the body.

13. The head mounted display according to claim 12, wherein the body motion detection unit includes a body imaging camera that is installed at a spectacle portion supporting the image display unit.

14. The head mounted display according to claim 13, wherein the body imaging camera is installed so that an imaging direction is a downward direction.

15. The head mounted display according to claim 12, further comprising:
a user moving image creation unit that creates an illustration moving image of the user on the basis of a detection result from the body motion detection unit,
wherein the reference image is a moving image, and
wherein the display control unit causes an illustration moving image of the user to be formed in addition to the reference image.

16. The head mounted display according to claim 12, wherein the body motion detection unit includes an external camera that is disposed at a position spaced apart from a spectacle portion supporting the image display unit and images the user.

17. The head mounted display according to claim 16, wherein the display control unit causes an image of the user captured by the external camera to be formed in addition to the reference image.

18. The head mounted display according to claim 8, wherein in a case where a predetermined part of the image has a difference of a predetermined level or more with the reference image at the same position, a marker is attached to the predetermined part.

19. The head mounted display according to claim 9, wherein the storage unit stores imaged motions of the body of the user from a shoulder to a lower portion of the body.

20. The head mounted display according to claim 8, wherein the body motion detection unit further detects motions of muscles and skeletons using an electromyograph.

21. A control method for a head mounted display for supporting improvement in an act of moving a body, the head mounted display including an image display unit that transmits external scenery therethrough and forms an image, the method comprising:
- detecting motions of a user and at least a part of a tool bundled with the body;
- accessing a reference image storage unit which stores a reference image used as a reference of the act for each type of acts, and acquires one or a plurality of reference images corresponding to a detection result from the detecting, wherein the acquisition of the one or plurality of reference images are based upon motion of the head of the user and at least one focused part of a body moving image; and
- comparing a content of data corresponding to the head of the user and the plurality of focused parts of the body moving image with search keys, and determining a closest relationship when a sum total of deviations for each focused part is smallest, the closest relationship being used to acquire the one or plurality of reference images;
- causing the image display unit to form the acquired one or plurality of reference images.

22. A control method for a head mounted display for supporting improvement in an act of moving a body, the head mounted display including an image display unit that transmits external scenery therethrough and forms an image, the method comprising:
- estimating a motion of a body of a user and at least a part of a tool bundled with the body;
- detecting a motion of the head of the user, the motion of the head of the user including positional movement and shift angle of the head;
- accessing a reference image storage unit which stores a reference image used as a reference of the act for each type of acts, and acquires one or a plurality of reference images corresponding to a detection result from the detecting;
- comparing a content of data corresponding to the head of the user and a plurality of focused parts of a body moving image with search keys, and determining a closest relationship when a sum total of deviations for each focused part is smallest, the closest relationship being used to acquire the one or plurality of reference images; and
- causing the image display unit to form the acquired one or plurality of reference images.

23. A non-transitory computer readable medium having embodied thereon a computer program for controlling a head mounted display for supporting improvement in an act of moving a body, the head mounted display including an image display unit that transmits external scenery therethrough and forms an image, the computer program causing the computer readable medium to implement:
- a function of detecting motions of a user and at least a part of a tool bundled with the body;
- a function of accessing a reference image storage unit which stores a reference image used as a reference of the act for each type of acts and acquires one or a plurality of reference images corresponding to a detection result from the detecting, wherein the acquisition of the one or plurality of reference images are based upon motion of the head of the user and at least one focused part of a body moving image;
- a function of comparing a content of data corresponding to the head of the user and the plurality of focused parts of the body moving image with search keys, and determining a closest relationship when a sum total of deviations for each focused part is smallest, the closest relationship being used to acquire the one or plurality of reference images, and
- a function of causing the image display unit to form the acquired one or plurality of reference images.

24. A non-transitory computer readable medium having embodied thereon a computer program for controlling a head mounted display for supporting improvement in an act of moving a body, the head mounted display including an image display unit that transmits external scenery therethrough and forms an image, the computer program causing the computer readable medium to implement:
- a function of estimating a motion of a body of a user and at least a part of a tool bundled with the body;
- a function of detecting a motion of the head of the user, the motion of the head of the user including positional movement and shift angle of the head;
- a function of accessing a reference image storage unit which stores a reference image used as a reference of the act for each type of acts, and acquires one or a plurality of reference images corresponding to a detection result from the detecting;
- a function of comparing a content of data corresponding to the head of the user and a plurality of focused parts of a body moving image with search keys, and determining a closest relationship when a sum total of deviations for each focused part is smallest, the closest relationship being used to acquire the one or plurality of reference images; and
- a function of causing the image display unit to form the acquired one or plurality of reference images.

* * * * *

UNITED STATES PATENT AND TRADEMARK OFFICE
CERTIFICATE OF CORRECTION

PATENT NO. : 10,162,408 B2
APPLICATION NO. : 15/631654
DATED : December 25, 2018
INVENTOR(S) : Hitoshi Saito et al.

Page 1 of 1

It is certified that error appears in the above-identified patent and that said Letters Patent is hereby corrected as shown below:

On the Title Page

Column 1, item (*) Notice, after "0 days." insert new line:
--This patent is subject to a terminal disclaimer.--

Column 2, item (45) after "Date of Patent" the date, should appear as follows:
--* Dec. 25, 2018--

Signed and Sealed this
Nineteenth Day of March, 2019

Andrei Iancu
*Director of the United States Patent and Trademark Office*